May 3, 1966 S. N. TOWER ET AL 3,249,506
INTEGRAL VAPOR GENERATING AND SUPERHEATING
NEUTRONIC REACTOR SYSTEM
Filed April 28, 1961 9 Sheets-Sheet 5

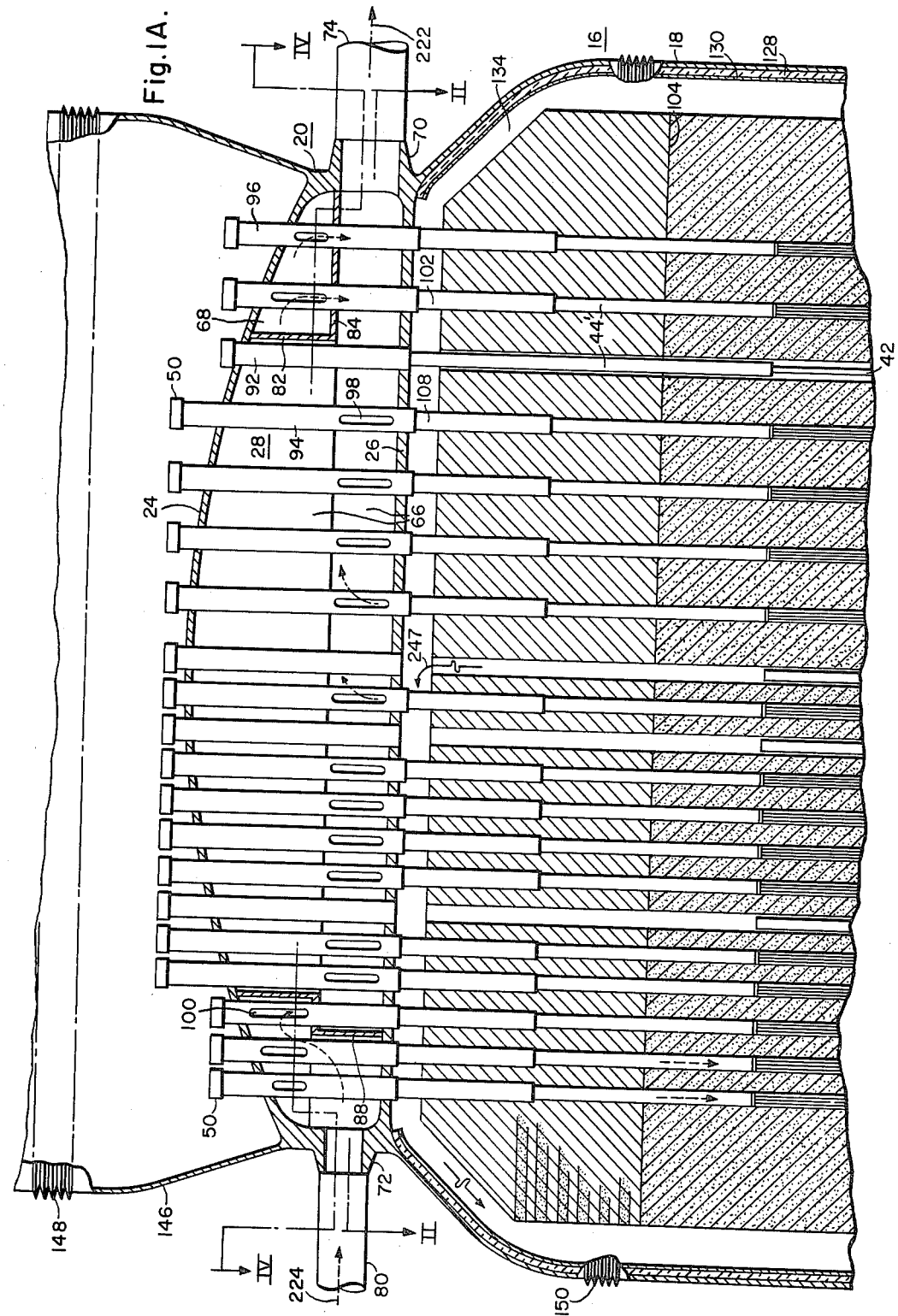
Fig. IA.

WITNESSES
Wm. B. Sellers
A. J. Santantonio

INVENTORS
Stephen N. Tower and
William H. Arnold, Jr.
BY
ATTORNEY

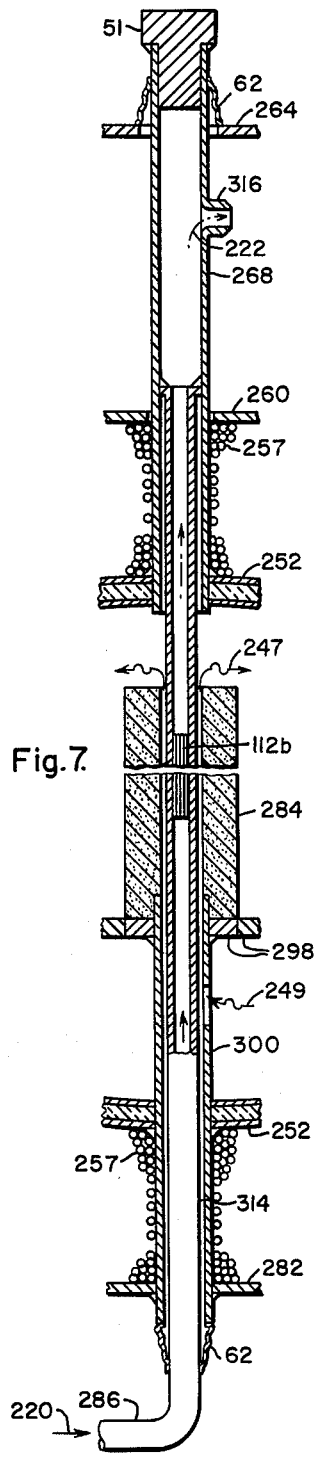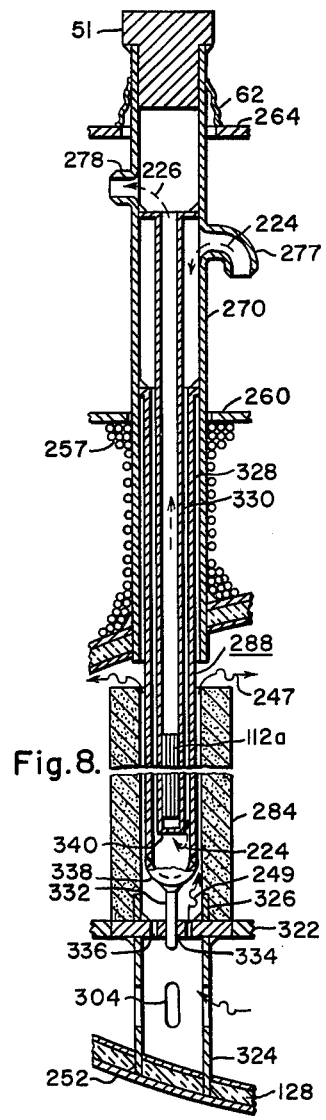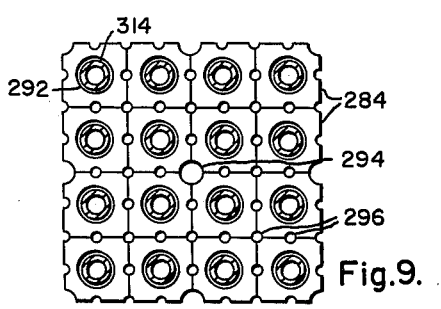

United States Patent Office 3,249,506
Patented May 3, 1966

3,249,506
INTEGRAL VAPOR GENERATING AND SUPER-HEATING NEUTRONIC REACTOR SYSTEM
Stephen N. Tower, Murrysville, Pa., and William H. Arnold, Jr., Washington, D.C., assignors to Westinghouse Electric Corporation, East Pittsburgh, Pa., a corporation of Pennsylvania
Filed Apr. 28, 1961, Ser. No. 106,247
7 Claims. (Cl. 176—55)

This invention relates in general to a direct cycle neutronic reactor system and more particularly to a system having an integral vapor generating and superheating reactor, including in certain modifications thereof a vapor reheating cycle.

As is well known, a neutronic reactor is arranged for transferring the heat developed in the fissioning process maintained in the core of the reactor to a suitable working fluid such as water, steam, or a combination thereof. Such fissioning is maintained by a chain reaction in a mass fissionable isotope, such as $U_{233}$, $U_{235}$, $Pu_{239}$, or combinations thereof, confined within the core of the reactor. The fissioning process is induced by the capture of a thermalized neutron which, in turn, results in the splitting of the fissionable atom into additional neutrons and fission fragments. The latter neutrons are categorized as fast and are thermalized by moderator material admixed with or juxtaposed to the fissionable material. The fissioning process, therefore, becomes chain reacting as long as sufficient thermalized neutrons are made available for each succeeding generation of fissions. The fissioning and moderating materials usually are surrounded by a neutron-reflecting material for improvement in neutron economy. The thermalized neutron flux level, however, is controlled by the positioning or presence of control rods employed in the reactor.

Direct cycle neutronic reactors of the prior art produced saturated vapor, such as saturated steam, which is used in external vapor utilizing means, such as steam turbines. However, "standard" steam turbines of today's power industry utilize high pressure superheated steam. These "standard" steam turbines are more efficient and cost considerably less than a saturated steam turbine. Today's power industry also utilizes a reheat cycle in a conventional power plant in order to obtain even higher efficiencies than can be obtained by utilizing only a superheated steam cycle. In the conventional reheat cycle, the high pressure superheated steam is passed through the high pressure and intermediate pressure sections of the turbine. The steam is then returned to the conventional steam generator, reheated, and then sent to a lower pressure section of the turbine.

Accordingly, it is the general object of this invention to provide a novel and more efficient direct cycle neutronic reactor system.

It is a more particular object of this invention to provide a system having a novel and more efficient integral boiling and superheating neutronic reactor, which is sometimes hereinafter referred to as IBSHR.

Another object of this invention is to provide a neutronic reactor system having a pressure tube design through which a flow of high pressure primary coolant can be maintained to transfer heat from the fissile fuel also contained within the pressure tube.

Still another object of this invention is to provide a direct cycle neutronic reactor system, which minimizes the weight, space requirement, and power requirements for auxiliary equipment by eliminating vapor pumps, for example as used in the "Loeffler" cycle, required to force saturated vapor through separate external vapor superheaters and eliminating heat sources external to the reactor used for superheating saturated vapor.

Still another object of this invention is to provide a novel and more efficient IBSHR system by reheating within the same reactor a vapor, which has already been utilized by a vapor utilizing means.

Another object of this invention is to provide the primary coolant at the proper pressure and temperature to the reheating portion of the reactor whenever the vapor utilizing means are isolated from the reactor so as to prevent damage to the pressure tubes within the reheating portion of the reactor.

Still another object of this invention is to provide an alternate vapor flow path and vapor pressure reducing means to the condensing portion of the vapor utilizing means whenever the inlet vapor flow from the reactor is isolated from the vapor utilizing means to prevent excessive pressure buildup and subsequent loss of primary coolant from the reactor system by the automatic operation of safety devices which are coupled to the reactor system and which prevent a pressure buildup beyond the capabilities of the reactor system.

Another object of this invention is to provide an emergency cooling system, which operates preferably by gravity flow, for cooling the primary coolant flowing through the reactor in the event the condensing portion of the vapor utilizing means is inoperative.

Briefly, the present invention accomplishes the above cited objects by providing a direct cycle neutronic reactor system. The system incorporates an integral boiling and superheating reactor (IBSHR) comprising a separate moderator structure, which in the examples herein utilizes a solid moderator material, a pressure tube design, and a two region reactor core in certain modifications thereof or a three region core in others. The moderator, for example, graphite, is contained in a low pressure tank. The pressure tubes, which contain both fissile fuel and primary coolant during reactor operation, are positioned vertically as viewed in the drawings and are uniformly spaced within the graphite moderator. The reactor core is divided in a plurality of regions with two or three being utilized in the examples herein depending on the use of reheat. Primary coolant, for example, primary water, enters the center region or boiling pressure tubes, absorbs heat from the fissile material contained inside the boiling pressure tubes, and is converted into a steam-water mixture. The steam-water mixture thus produced is then sent to a vapor separator, for example, a steam drum, where the steam is separated from the water. The separated steam, which at this stage is saturated steam, is then sent to the pressure tubes or reactor superheat tubes in another region of the core. The saturated steam then flows through the reactor superheat tubes and absorbs heat from the fissile fuel contained therein to become superheated steam. The superheated steam is then sent directly to the turbine to generate electric power. After passing through the turbine, the steam is condensed and returned to the nuclear reactor to repeat the previously described cycle. In the aforementioned example of a two region core it is also possible to reverse the locations of the boiling and superheat regions of the reactor core, so that the boiling region can be located on the periphery and the superheat region in the center of the reactor core.

In addition, a blanket of inert gas, for example, helium, desirably is maintained within the low pressure reactor vessel containing the graphite moderator and pressure tubes. Since the graphite is operated in a hot condition (approximately 1200 to 1300° F.), substantially all of the moderator heat is transferred back to the pressure tubes where it is used to produce saturated and superheated steam. To facilitate the heat transfer from the graphite moderator to the primary coolant passing through the pressure tubes, the inert gas is circulated by a blower. In other applications of the invention, the heated helium can also be cooled in an external heat exchanger.

An additional reactor arrangement as taught by the invention is to add a third region to the reactor core. This third region is used to reheat steam which has previously passed through a section of the steam turbine or other steam utilizing equipment and is returned to the third or reheating region of the reactor core for the purposes of reheating the steam. Here again, the steam to be reheated passes through pressure tubes containing fissile fuel. The steam on passing over the fissile fuel absorbs heat from the fissile fuel and thereby causes the temperature of the steam to rise. The reheated steam is then sent from the reheat tubes to a lower pressure section of the steam turbine where additional electric power is generated.

There is also incorporated into the reactor system several features to protect the reactor core from damage during emergency situations. One of these features is utilized in the event of a loss of power to the circulating pump which provides primary water to the reactor boiling tubes. Thus, an emergency cooler is located at an elevation sufficiently above the steam drum to permit gravity water return from the cooler to the steam drum. Water flow is then maintained in the reactor boiling tubes by natural circulation from the steam drum. The reactor superheat tubes in turn are cooled by the steam generated in the reactor boiling tubes.

Another feature of this invention is the use of a steam dump arrangement in the event of a loss of power accident (e.g. a turbine trip-out). In this arrangement the turbine is bypassed by a valved steam dump conduit which feeds the steam produced by the reactor into the condenser, and also reduces the steam pressure before the steam enters the condenser.

Where the reactor has a reheat portion, a turbine bypass conduit is used which has a desuperheater therein for cooling the superheated steam from the reactor superheat tubes in order to provide steam of the proper temperature to the reactor reheat tubes.

Further objects and advantages of the invention will become apparent as the following description proceeds and features of novelty, which characterize the invention, will be pointed out in particularity in the claims annexed to and forming a part of this specification.

For a better understanding of the invention, reference may be had to the accompanying drawings in which:

FIG. 7 is a simplified vertical sectional view of a straight through type pressure tube adapted for use in the reactor system disclosed hereinafter;

FIG. 8 is a simplified vertical sectional view of a two-pass type pressure tube adapted for use in the reactor system disclosed hereinafter;

FIG. 9 is a partial cross-sectional view typical for the reactor core and taken along reference line VIII—VIII of FIG. 6.

STAYED-TUBE SHEET TYPE IBSHR

Figure 1B:
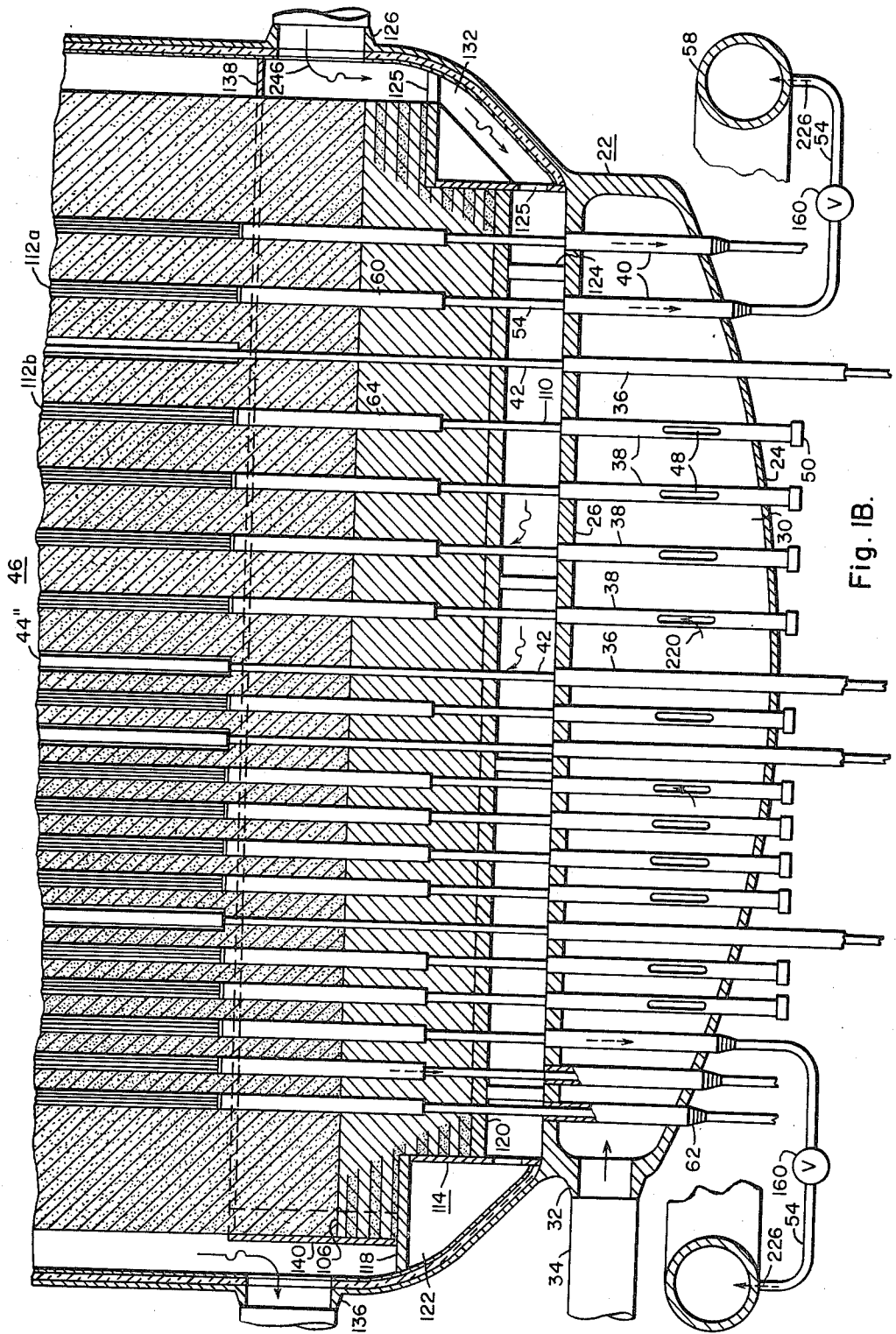
FIGURE 1 is a vertical section through the reactor shown schematically in FIG. 5 as taken generally along the reference line I—I of FIG. 2.
Figure 2:
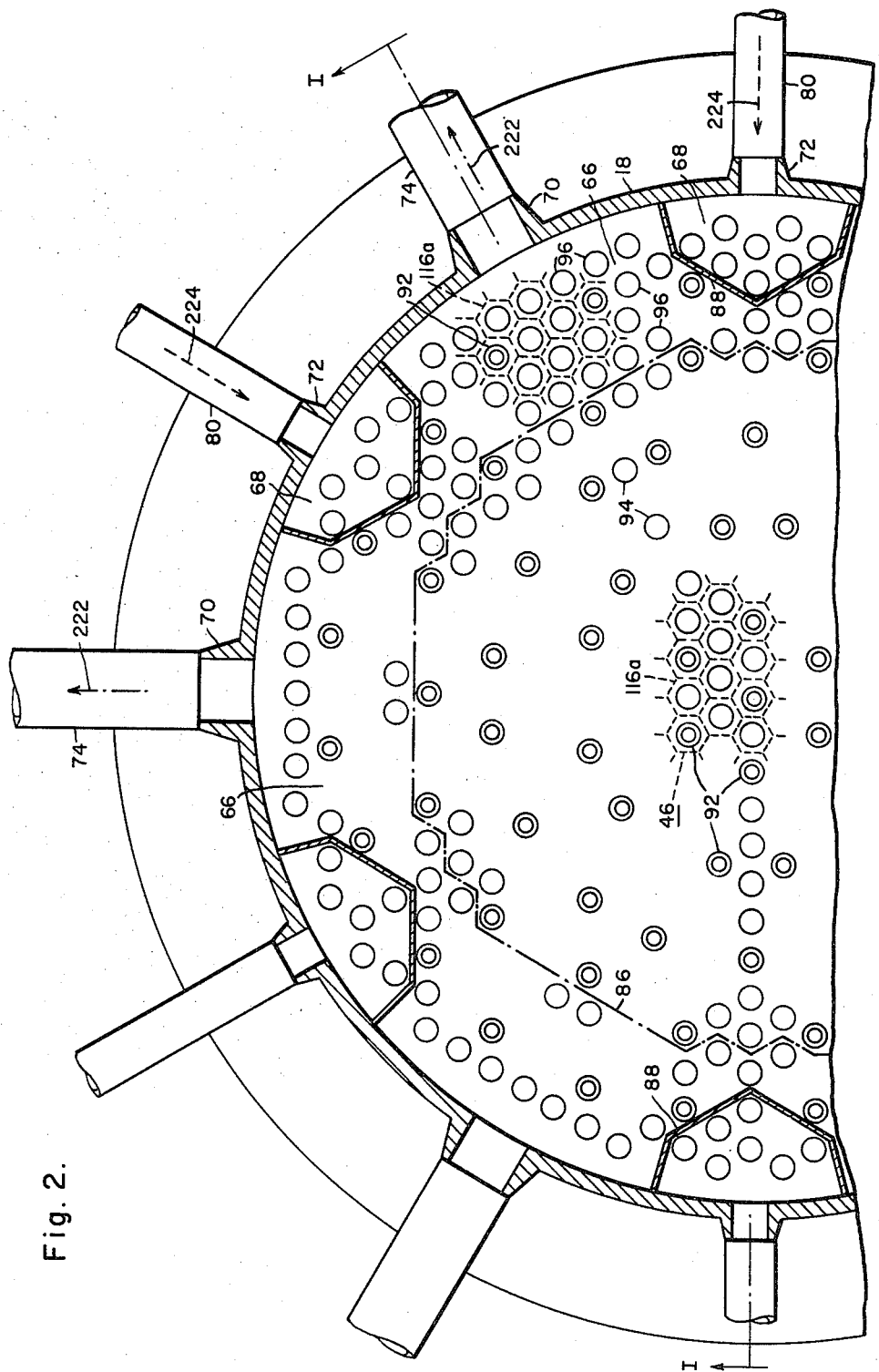
FIG. 2 is a partial cross-sectional view of the reactor shown in FIG. 1 and taken along reference line II—II thereof.
Figure 3:
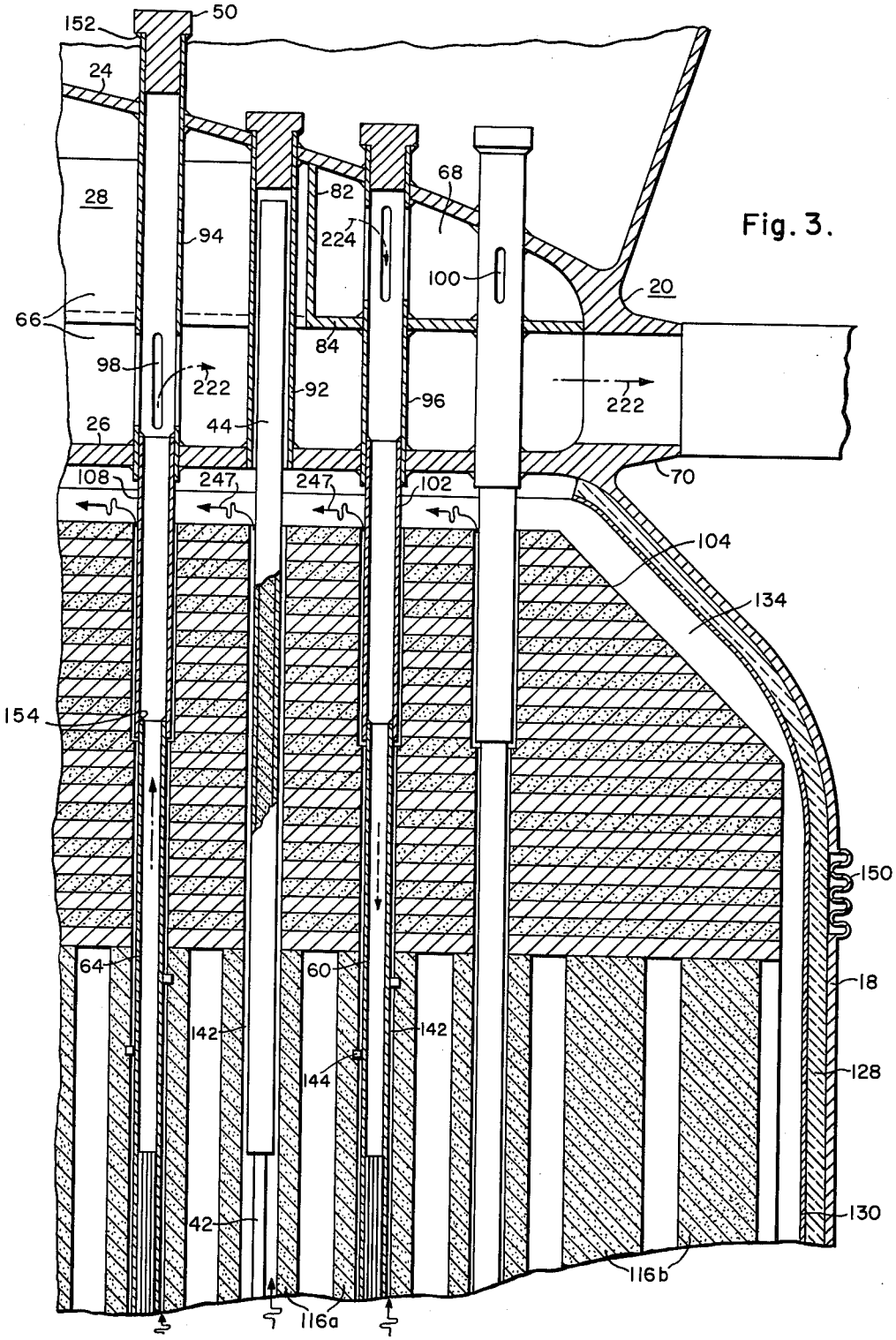
FIG. 3 is an enlarged view of the upper right hand area of FIG. 1, showing details in that area with greater clarity.

Referring now to FIGS. 1 through 3 of the drawings, an illustrative example of the direct cycle, integral boiling and superheat reactor (IBSHR) of the pressure tube type is depicted therein. Also in FIG. 2 a single circle represents an upper boiling or superheat stay, and a double circle represents an upper control rod stay. In this embodiment, a reactor 16 of the stayed-tube type is shown. A reactor vessel 18, fabricated generally in the form of a right circular cylinder and having stayed-tube sheets at its ends, forms the outer shell of the reactor 16. An upper stayed-tube sheet 20 and a lower stayed-tube sheet 22 each have a spherically shaped outer plate 24 and a flat inner plate 26 forming an enclosed upper plenum chamber 28 and an enclosed lower plenum chamber 30. At the periphery of the lower stayed-tube sheet 22, is formed a liquid or water inlet nozzle 32, which couples the lower plenum chamber 30 to a circulating pump discharge conduit 34. A plurality of lower stays 36, 38 and 40 are vertically disposed within the lower plenum chamber 30 and pass through openings in the flat inner plate 26 and the spherically shaped outer plate 24 of the lower stayed-tube sheet 22. The lower stays 36, 38 and 40 are sealably strength-welded to the spherically shaped outer plate 24 and the flat inner plate 26 to prevent the plates 24 and 26 from blowing apart as a result of the internal pressure within the lower plenum chamber 30.

The lower control rod stays 36 extend downwardly to a control rod drive mechanism (not shown) and are hermetically sealed thereto. A control rod drive shaft 42 connects the control rod drive mechanism (not shown) to a control rod 44 and passes through the lower control rod stay 36. The control rods 44 are distributed substantially uniformly throughout an active core 46 to be described more fully hereinafter. This large number of control rods 44 is not needed to shut down the reactor 16, but is needed to assure proper power distribution during the operational life of the active core 46. The control rods 44 are cylindrical in shape and consist of boron carbide ($B_4C$) inserted in a thin wall stainless steel can. The control rod drive shaft 42 is a thin wall stainless steel tube filled with graphite. The control rods 44 are driven by conventional rack and pinion control rod drives (not shown) located below and external to the reactor 16. No shaft seals will be used, as the drive motors (not shown) will be canned to prevent the loss of the secondary coolant or helium being circulated within the reactor vessel 18 for cooling purposes. The control rods 44 will also be vented directly into the space enclosed by the reactor vessel 18 to prevent pressure buildup and subsequent distortion of the control rods 44 by helium gas produced by the absorption of neutrons in the boron poison.

As shown in the drawings, the control rods 44 are inserted from the bottom of the reactor 16. In this arrangement of the invention, the control rods 44 coextend with the entire height of the active core 46, the total height of which is represented by the length of fuel assemblies 112. The uppermost position of the control rod 44 is that shown at 44'. However, the lowermost position of the control rod 44 is that shown at 44" so that the control rods 44, when scrammed, drop to a central position within the active core 46. When the control rods 44 are withdrawn from the active core 46, they are displaced upwardly and the driving mechanism therefor is arranged in a conventional manner to release the control rods 44 upon failure of electric power. Accordingly, the control rod 44 arrangement is completely failsafe inasmuch as no force accumulating means such as springs or pneumatic tanks are required to force the control rods into the active core 46 in the event of power failure.

Each of the lower boiling stays 38 has a plurality of elongated holes 48, which couple the lower plenum chamber 30 to the inside of the stay 38 to permit the passage of primary water from the plenum chamber 30 to the inside of the lower boiling stay 38. An end plug 50 (FIG. 3) is used with the top portion of the end plug 50 being sealably welded to the lower boiling stay 38. An alternative method of plugging the lower open end of the lower boiling stay is described and claimed in a copending application of P. J. Collins et al., entitled "Nuclear Reactor Refueling System," filed August 31, 1959, Serial No. 837,091, now U.S. Patent No. 3,167,481, issued January 26, 1965, and assigned to Canadian Westinghouse Company, Ltd.

The lower superheat stays 40 are disposed within the lower plenum chamber 30 and secured to the lower stayed-tube sheet 22 in the same manner as previously described for the lower boiling stays 38. Also the lower end of each lower superheat stay 40 protrudes a short distance beyond the outer plate 24 of the lower stayed-tube sheet 22. Through each of the lower superheat stays 40 slidably passes a superheat tube 54. The superheat tubes 54 couple reactor superheat tubes 60, to be described hereinafter, to a ring shaped superheat outlet header 58 which has a tubular cross-section. To the lower end of each of the lower superheat stays 40 is sealably secured a bellows type expansion joint 62, and the lower end of the bellows joint 62 is sealably secured to the superheat tubes 54. The bellows joint 62 are of conventional construction and need not be elaborated upon here. The bellows joint 62 has a dual function in that it prevents the escape of the helium gas, contained within the reactor vessel 18, through the clearance between the superheat tube 54 and the lower superheat stay 40 and also provides a means for taking care of the differential expansion which occurs between the reactor superheat tubes 60 and reactor boiling tubes 64 due to a temperature difference existing between the reactor superheat tubes 60 and the reactor boiling tubes 64.

Figure 4:
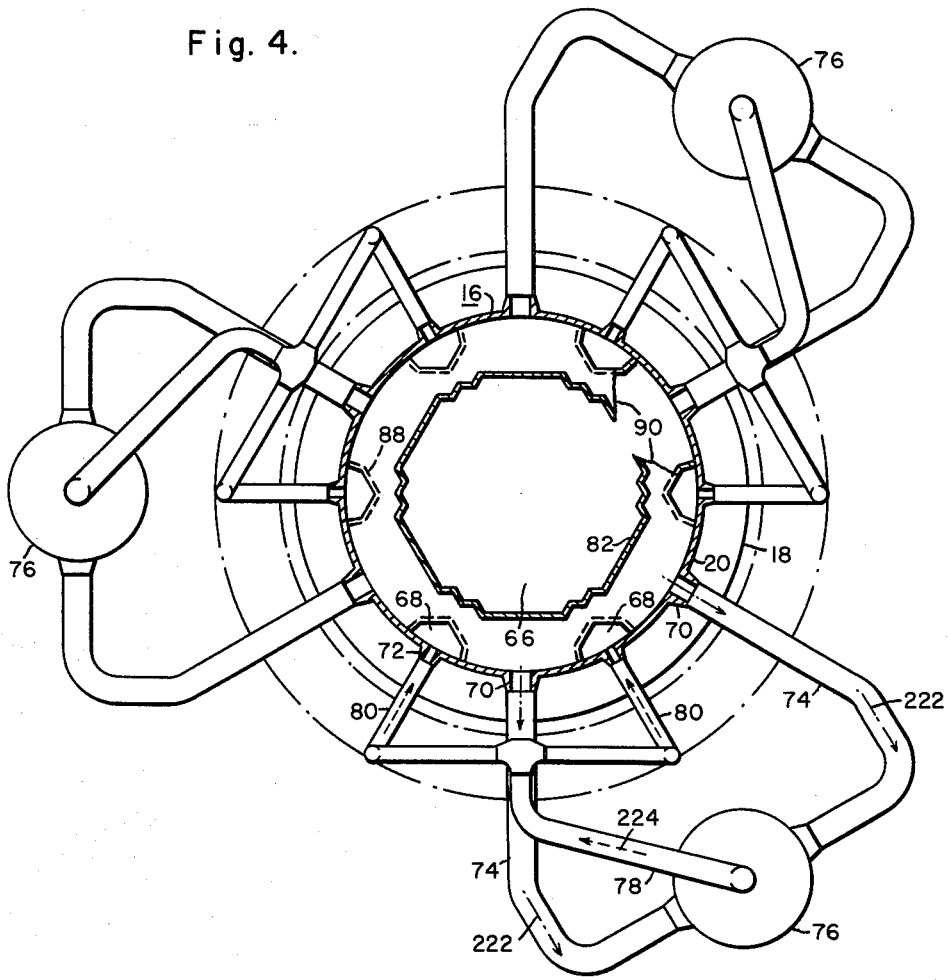
FIG. 4 is a top plan view of the vapor separators and conduit arrangement between the vapor separators and reactor, with a cross-sectional view of the reactor taken along the reference line IV—IV of FIG. 1 to show more clearly the baffle arrangement at the top of the reactor.

Returning now to the upper stayed-tube sheet 20, there is formed at its periphery a plurality of steam-water outlet nozzles 70 and a plurality of steam inlet nozzles 72. The nozzles 70 and 72 are alternatively spaced as shown in FIG. 4. The plenum chamber 28, within the stayed-tube sheet 20, is divided into two sealably separated spaces, a steam-water space 66 and a steam space 68. The steam-water outlet nozzle 70 couples the steam-water space 66 to a steam-water conduit 74, which in turn is coupled to the lower end of a conventional vapor separator or steam drum 76 (FIG. 4). As shown in FIG. 4, two adjacent steam-water conduits 74 enter the lower end of the steam drum 76. A steam drum outlet conduit 78 (FIG. 4) then couples the top of the steam drum 76 (FIG. 4) to two adjacent reactor steam inlet conduits 80 (FIG. 4). The steam inlet nozzle 72 then couples the reactor steam inlet conduit 80 to the steam space 68 within the upper plenum chamber 28.

FIG. 4 also shows that there are three steam drums 76 coupled to the reactor 16. FIG. 4 also shows that there is a separate fluid circuit connecting each steam drum 76 to the reactor 16. In each circuit the steam-water mixture from the steam-water space 66 flows to the steam drum 76, as indicated by the dot-dash line flow arrow 222. The steam is separated from the steam-water mixture in the steam drum 76. The steam then returns from the top of the steam drum 76 and enters the steam space 68 within the upper stayed-tube sheet 20, as indicated by the broken line flow arrow 224.

Returning now to FIGS. 1 through 3, the steam space 68 within the plenum chamber 28 is formed by a vertical steam baffle 82, a horizontal steam baffle 84, and a portion of the outer plate 24. The vertical steam baffle 82 is sealably welded to the spherically shaped outer plate 24, extends downwardly to a point above the steam-water outlet nozzle 70, and is juxtaposed from the periphery of the upper stayed-tube sheet 20 in a generally hexagonal shape as shown in FIG. 4 or as shown by reference line 86 (FIG. 2). The horizontal steam baffle 84 is sealably welded to the bottom of the vertical steam baffle 82 and also to the periphery of the upper stayed-tube sheet 20. Therefore, this permits the steam-water mixture in the steam-water space 66 to flow under the steam space 68 and through the steam-water outlet nozzle 70.

At each of the steam inlet nozzles 72, a space is enclosed by the horizontal steam baffle 84, the flat inner plate 26, and a five-sided steam inlet baffle 88 as shown more particularly in FIGS. 2 and 4. The steam inlet baffle 88 is vertically positioned, encloses a space surrounding the steam inlet nozzle 72, and is sealably welded to both the horizontal steam baffle 84 and the flat inner plate 26. At each of the steam inlet nozzles 72, the horizontal steam baffle 84 is cutout so as to form an opening equal to the area enclosed by the steam inlet baffle 88 in order to permit the steam entering through the steam inlet nozzle 72 to flow into the steam space 68. The vertical steam baffle 82 and the horizontal steam baffle 84 has been broken away at reference character 90 (FIG. 4) in order to indicate more clearly the existence of the horizontal steam baffle 84. FIG. 4 shows a plan view of the horizontal steam baffle 84 located between the vertical steam baffle 82 and the outer periphery of the upper stayed-tube sheet 20 along with the cutouts in the horizontal steam baffle 84 which conform to the space enclosed by the steam inlet baffle 88.

A plurality of upper control rod stays 92, upper boiling stays 94 and upper superheat stays 96 are vertically disposed and secured within the upper plenum chamber 28 in the same manner as was previously described for the lower stays 36, 38 and 40 within the lower plenum chamber 30. In addition, the upper control rod stays 92 and the upper superheat stays 96, which pass through the horizontal steam baffle 84, are sealably welded to the horizontal steam baffle 84. All the stays 92, 94 and 96 protrude a short distance above the spherically shaped outer plate 24 and have end plugs 50 or the alternative method of plugging as previously described in connection with the lower boiling stays 38. The upper stays 92, 94 and 96 are located directly above and aligned with their respective lower stays 36, 38 and 40. The upper control rod stays 92 permit the control rods 44 to enter slidably therein. The upper boiling stays 94 have a plurality of upper boiling stay holes 98 located at the lower end of each boiling stay 94 to permit the flow of steam-water mixture from inside the upper boiling stays 94 to the steam-water space 66. Each of the upper superheat stays 96 has a plurality of upper superheat stay holes 100 so as to permit the flow of steam from the steam space 68 into the upper superheat stays 96.

A superheat extension tube 102 is inserted a short distance into the lower portion of each upper superheat stay 96 and welded to the inner surface of the stay 96. The superheat extension tube 102 extends downwardly in a vertical position to a point approximately at the center of an upper shield 104 to be described hereinafter. The vertically positioned reactor superheat tube 60 is then inserted a short distance into the lower end of the superheat extension tube 102 and welded to the inner surface of the extension tube 102. The reactor superheat tube 60 extends downwardly through the active core 46 to a point approximately at the center of a lower shield 106 also to be described more fully hereinafter. The superheat tube 54 is then welded to the lower end of the reactor superheat tube 60.

A boiling extension tube 108 is positioned and secured in the same manner as previously described for the superheat extension tube 102. The reactor boiling tube 64 is also positioned and secured in the same manner as previously described for the reactor superheat tube 60. However, in the case of the reactor boiling tube 64, a boiling tube 110 couples the lower boiling stay 38 to the reactor boiling tube 64 and is welded at each end to the stay 38 and the tube 64. The boiling tube 110 also prevents radiation streaming from the active core 46 to the lower stayed-tube sheet 22.

At the center of each of the reactor superheat tubes 60 and the reactor boiling tube 64 is enclosed at least one fuel assembly 112a and 112b respectively. A suitable type of fuel assembly 112 and its installation within the reactor boiling tube 64 and reactor superheat tube 60 is described and claimed in the copending application of S. N. Tower, "Neutronic Reactor and Fuel Element Therefor," filed April 22, 1960, Serial No. 24,128, now U.S. Patent No. 3,211,623, issued October 12, 1965 and assigned to the present assignee.

Tubes 54, 60, 64, 102, 108, and 110 together with all fuel elements 112, are supported by both the upper stayed-tube sheet 20 and the lower stayed-tube sheet 22. The reactor 16, in turn, is supported by a circular skirt (not shown) welded to the bottom of the reactor vessel 18. The circular skirt, in turn, is supported by concrete foundation (not shown).

A support structure 114 is located at the bottom of the reactor vessel 18 and supports the weight of the lower shield 106, a plurality of graphite cells 116 to be described hereinafter, and the upper shield 104. The support structure 114 comprises an annular plate type support 118, having a right angle cross-section, and a circular plate 120. The annular support 118 is given further rigidity by a plurality of gusset plates 122 welded to the plate support 118. The circular plate 120 is positioned at the center of the vertical leg of the plate support 118 and welded thereto. The circular plate 120 can also be supported by a plurality of tubular supports 124 uniformly spaced under the entire area of the circular plate 120. The tubular supports 124 are welded to the circular plate 120 and rest on the flat inner plate 26. The circular plate 120 can also be supported by welding it to the vertical leg of the plate support 118 in combination with the use of the tubular supports 124. The circular plate 120 also has a plurality of openings to permit the passage of the control rod followers 42, the boiling tubes 110, and the external superheat tubes 54. The annular plate type support 118 has a plurality of openings 125 at the outer periphery of the horizontal leg and also at the bottom of the vertical leg to permit the passage of helium gas from a gas inlet nozzle 126 to be described hereinafter to the space between the circular plate 120 and the flat inner plate 26. The lower shield 106 is circular in shape and comprises alternate layers of boronated graphite and steel, as shown in FIG. 3 for the upper shield 104. The part of the lower shield 106, which is below the horizontal plate of the annular plate type support 118, is contained within the vertical leg of the plate support 118. The layers of the lower shield 106 above the plate support 118 have an outer diameter which permits the formation of a lower annular passage 132 between the outer edge of the lower shield 106 and a sheet metal cover 130 which covers insulation 128. Holes are also provided in the lower shield 106 to permit the passage of tubes 54, 60, 64, 110 and control rod drive shaft 42.

Supported by the lower shield 106 are a plurality of the graphite cells 116 which have a hexagonal cross-section. The graphite cells 116 have a vertical height of approximately one-half the height of the reactor vessel 18. The overall diameter of the entire group of graphite cells 116 is the same as the overall diameter at the top of the lower shield 106. Each graphite cell 116a has one boiling tube 64, one reactor superheat tube 60 or one control rod 44 passing longitudinally through its center in the region of the active core 46. In this example, the active core 46 comprises the volume which contains the fuel assemblies 112. The graphite cells 116b located beyond the outer periphery of the active core 46 are constructed in the same manner as the graphite cells 116a, except for the fact that there are no holes longitudinally through the center of the cells 116b. The graphite cells 116b (FIG. 3) surrounding the active core 46 and that portion of the graphite cells 116a above and below the active core 46 comprise the reflector region of the graphite. That portion of the graphite cells 116a within the active core 46 comprise the moderator region. Supported by the graphite cells 116 is the upper shield 104. The upper shield 104 is constructed in the same manner as previously described for the lower shield 106. The upper shield 104 is also shaped so as to provide an upper annular passage 134 between its outer diameter and the sheet metal cover 130 and also with the flat inner plate 26 so as to provide a passage for the helium gas to a gas outlet nozzle 136.

The lower shield 106 and the upper shield 104 are provided to protect the upper stayed-tube sheet 20 and the lower stayed-tube sheet 22 from radioactive activation. The reflector region enveloping the active core 46 is provided for neutron economy and flux flattening. The moderator region within the active core 46 is provided to thermalize fast neutrons.

The inner surface of the reactor vessel 18 is covered with a blanket of insulation 128, which is sufficiently thick to maintain the temperature of the reactor vessel 18 at approximately the same level as the temperature of the upper stayed-tube sheet 20 and the lower stayed-tube sheet 22 in order to eliminate the differential expansion problem which exists between the reactor vessel 18 and the stayed-tube sheets 20 and 22. The sheet metal cover 130 is then used to cover the inner surface of the insulation 128 to protect the insulation 128 from the flow of helium gas. Insulation (not shown) can also be provided on the outside upper and lower portions of the reactor vessel 18 to decrease the temperature gradient between the tube sheets 20 and 22 and the reactor vessel 18.

At the lower portion of the reactor vessel 18 is provided the gas inlet nozzle 126 to permit the entrance of cooled helium gas. Directly opposite the gas inlet nozzle 126 is provided the gas outlet nozzle 136 to permit the exit of the heated helium gas. The inlet and outlet helium flows are separated by an annular gas baffle 138, which is horizontally positioned immediately above the gas nozzles 126 and 136 and is fastened to the outer periphery of the graphite reflector region. The horizontal gas baffle 138 extends from the outer periphery of the graphite reflector region to the inner surface of the sheet metal cover 130. To reduce the leakage between the gas baffle 138 and the sheet metal cover 130 a labyrinth type seal (not shown) can be used at the sheet metal cover 130. A portion of the gas baffle 138 is cut away opposite the gas outlet nozzle 136 in order to permit the passage of helium gas from the upper passage 134 to flow through the gas outlet nozzle 136. A vertical gas baffle 140 is then sealably secured to the outer edge of the horizontal gas baffle 138. The baffle 140 is also sealably secured to the horizontal portion of the plate type support 118, so as to form a passage between the vertical gas baffle 140 and the gas outlet nozzle 136. The vertical gas baffle 140 extends sideways so as to abut against the sheet metal cover 130 to prevent the direct flow of helium from the gas inlet nozzle 126 to the gas outlet nozzle 136 by way of the lower passage 132. For the same reason no holes are provided in the horizontal section of the annular plate type support 118 in the area enclosed between the vertical gas baffle 140 and that portion of the reactor vessel 18 containing the gas outlet nozzle 136.

An annular gas passage 142 is provided between each tube 60 and 64 and its surrounding shields 104 and 106 and graphite cells 116 in order to provide a flow path for the helium gas from the bottom of the reactor vessel 18 to the top of the reactor vessel 18. The annular gas passage 142 is also provided in the same manner for each control rod drive shaft 42 and each control rod 44. The flow of the helium through the annular passages 142, just described, aids in the transfer of heat from the moderator and reflector regions to the primary coolant flowing through the tubes 60 and 64. This flow of helium through the active core also aids in cooling the control rods 44. A plurality of aluminum oxide ($AL_2O_3$) spacers 144 (FIG. 3) are provided at each end of the graphite cell 116a between each reactor boiling tube 64 and reactor superheat tube 60 and its corresponding graphite cell 116a. The spacers 144 are threaded into the graphite cell 116a and butt against the tubes 60 and 64. Therefore, the tubes 60 and 64 aid in holding the graphite cells 116a in position. The spacers 144 also prevent the tubes 60 and 64 from touching the graphite cells 116a and thus producing hot spots and possible burnout in the tubes 60 and 64. The spacers 144 are spaced radially and longitudinally with respect to one another. It is also to be noted that the extension tubes 102 and 108 provide shielding against radiation streaming along the gas passages 142.

A refueling tank 146 is also provided above the upper stayed-tube sheet 20 and is welded to the top of stayed-tube sheet 20. A refueling tank bellows joint 148 is provided in the refueling tank 146 in order to take care of the differential expansion which may occur between the refueling tank 146 and the upper stayed-tube sheet 20. A reactor vessel bellows joint 150 can also be provided in the upper portion of the reactor vessel 18 to take care of differential expansion between the upper stayed-tube sheet 20 and the reactor vessel 18. In order to carry the load when the refueling tank is filled with water, conventional stops can be provided within the refueling tank bellows joint 148 and the reactor vessel bellows joint 150 to prevent the compression of the joints 148 and 150 beyond a predetermined point. An alternate method that can be used is to provide separate supports for the upper stayed-tube sheet 20 by any conventional method.

Refueling and recycling of the fuel assemblies 112 can be accomplished in the following manner. First the refueling tank 146 is filled with water. Then the end plug 50 is removed by cutting a weld 152 (FIG. 3). Remote handling tools are then lowered through the upper boiling stay 94, through the boiling extension tube 108 and through the reactor boiling tube 64 down to the top of the fuel assemblies 112b. Lugs, then provided at the top of the fuel assembly 112b, can then be grasped by the remote handling tool (not shown) and the fuel assembly 112b removed. The fuel assembly 112a in the reactor superheat tube 60 can also be removed in a similar manner. At this stage the fuel assemblies 112 can be relocated from one tube to another or can be replaced by a new fuel assembly 112. The control rod 44 can also be removed in a generally similar manner except that the refueling tank 146 is dry and the control rod 44 is withdrawn into a lead cast (not shown) located above the reactor 16. In addition, the control rod 44 must be disconnected from the control rod drive mechanism located below the reactor 16.

It is also to be noted that the reactor boiling tube 64 can be removed from above the reactor 16 by cutting a weld 154, which holds the reactor boiling tube 64 to the boiling extension tube 108. In addition, the end plug 50 must also be removed from the lower boiling stay 38 so as to provide access to the weld between the bottom of boiling tube 110 and the inner surface of the lower boiling stay 38; whereby, the weld can be cut and the reactor boiling tube 64 removed by a remote handling tool through the top of the reactor 16. The reactor superheat tube 60 can be removed in the same manner as described for the reactor boiling tube 64, except that the weld between the bellows joint 62 and the superheat tube 54 must be cut and the pressure tube 54 must itself be cut to permit the removal of the reactor superheat tube 60 through the top of the reactor 16.

Referring now specifically to FIG. 2, it can be seen that this is a two region core; namely, the boiling region and a superheating region. The boiling region comprises all of the reactor boiling tubes 64 which are located within the inner confines of the reference line 86. The superheat region comprises all of the reactor superheat tubes 60 which are located between the reference line 86 and the reactor vessel 18.

The following tabulation of plant and reactor characteristics and of materials of construction are presented as a guide to the construction of a reactor plant embodying the present invention with the obvious intent that the tabulation is merely exemplary of an illustrative application of the invention and not limitative thereof. Obviously, differing characteristics and materials can be selected by the nuclear engineer upon the basis of readily available technology, when constructing a nuclear plant having a differing power rating.

*Plant characteristics*

| | |
|---|---|
| Reactor heat | 47.5 mw. |
| Gross electric output | 16.5 mw. |
| Auxiliary load | .7 mw. |
| Net electric output | 15.8 mw. |
| Overall plant efficiency | 33.3 percent. |
| Turbine heat rate | 9740 B.t.u./kw. hr. |
| Turbine cycle efficiency | 35.0 percent. |
| Turbine throttle pressure | 850 p.s.i.g. |
| Turbine throttle temperature | 900° F. |
| Reactor heat | $1.62 \times 10^8$ B.t.u./hr. |
| Steam flow | 147,700 lbs./hr. |
| Feedwater temperature | 380° F. |
| Boiling recirculation rate | 10/1. |
| Recirculation flow | $1.48 \times 10^6$ lbs./hr. |
| Boiling section exit quality, avg. | 10%. |
| Superheated steam line | 1–6 in. ⅜ in. wall. |
| Saturated steam lines | 2–4 in. schedule 40. |
| Steam-water lines | 2–8 in. .352 in. wall. |
| Recirculation lines | 2–6 in. schedule 40. |
| Feedwater line | 1–4 in. schedule 40. |
| Ring header for S.H. steam | 1–8 in. schedule 60. |
| Circulation pumps | 2–2000 g.p.m. each. |

*Reactor characteristics*

| | |
|---|---|
| Reactor height | 23 ft. 9 in. |
| Reactor outside diameter | 10 ft. 5 in. |
| Reactor vessel wall thickness | .25 in. 304 SS. |
| Reactor vessel working conditions | 30 p.s.i.g. 500° F. |
| Reactor vessel design conditions | 50 p.s.i.g. 1000° F. |
| Moderator operating temperature | 1100–1200° F. |
| Helium circulating gas flow | 15,500 lbs./hr. |
| Helium circulating line | 1–12 in. sch. 10. |
| Helium circulating system pressure drop | ≈4 p.s.i. |
| Graphite cylinder height (including reflector) | 10 ft. 0 in. |
| Graphite cylinder diameter (including reflector) | 9 ft. 4 in. |
| Graphite reflector thickness | ≈2 ft. 0 in. |
| Active core height | 6 ft. 0 in. |
| Active core diameter | 5 ft. 7 in. |
| Pressure tube lattice | 7 in. Δ pitch. |
| Number of pressure tubes | 85. |
| Number of boiling tubes | 49. |

| | |
|---|---|
| Number of superheating tubes | 36. |
| Pressure tube design conditions | 1080 p.s.i.g. at 1000° F. |
| Pressure tube max. working conditions | 900 p.s.i.g. at 900° F. |
| Pressure tube material | Type 316 SS. |
| Pressure tube O.D. | 3.00 in. |
| Pressure tube I.D. | 2.76 in. |
| Pressure tube wall thickness | .120 in. |
| Moderator/U volume ratio | 23.9/1. |
| Number of fuel rods/pressure tube | 37. |
| Fuel rod O.D. | .350 in. |
| Fuel rod cladding | 0.15 in. SS. |
| Pellet diameter | .318 in. |
| Fuel rod spacing (Δ pitch) | .400 in. |
| Weight of $UO_2$ | 6490 lbs. |
| $U_{235}$ enrichment, boiling region | 5.5%. |
| $U_{235}$ enrichment, superheating region | 4.5%. |
| Total number of fuel rods | 3145. |
| Number of control rods | 21. |
| Type control rods | 1.70 in. O.D.-B.C. |
| Core heat transfer surface | 1728 ft.$^2$. |
| Boiling heat transfer surface | 996 ft.$^2$. |
| Superheating heat transfer surface | 732 ft.$^2$. |
| Core average heat flux | 93,800 B.t.u./hr. ft.$^2$. |
| Boiling region average heat flux | 124,500 B.t.u./hr. ft.$^2$. |
| Superheating region average heat flux | 51,700 B.t.u./hr. ft.$^2$. |
| Core maximum heat flux | 390,000 B.t.u./hr. ft.$^2$. |
| Ratio maximum/average heat flux | 4.16. |

*Materials summary*

| | |
|---|---|
| Fuel | $UO_2$. |
| Fuel cladding | Type 316 stainless steel. |
| Pressure tubes | Type 316 or 347 stainless steel. |
| Tube sheets | Type 304 stainless steel. |
| Reactor vessel | Type 304 stainless steel. |
| Circulating water piping | Type 304 stainless steel. |
| Saturated steam piping | Type 304 stainless steel. |
| Superheater steam piping | 2¼ Cr., 1 mo. Croloy. |
| Feedwater piping | A-106 carbon steel. |
| Steam drum | A-212 with SS. clad. |
| Moderator | Graphite-reactor grade. |
| Cover gas | Helium. |
| Control rod poison | Boron carbide. |

OPERATION OF THE STAYED-TUBE SHEET TYPE IBSHR

Figure 5:
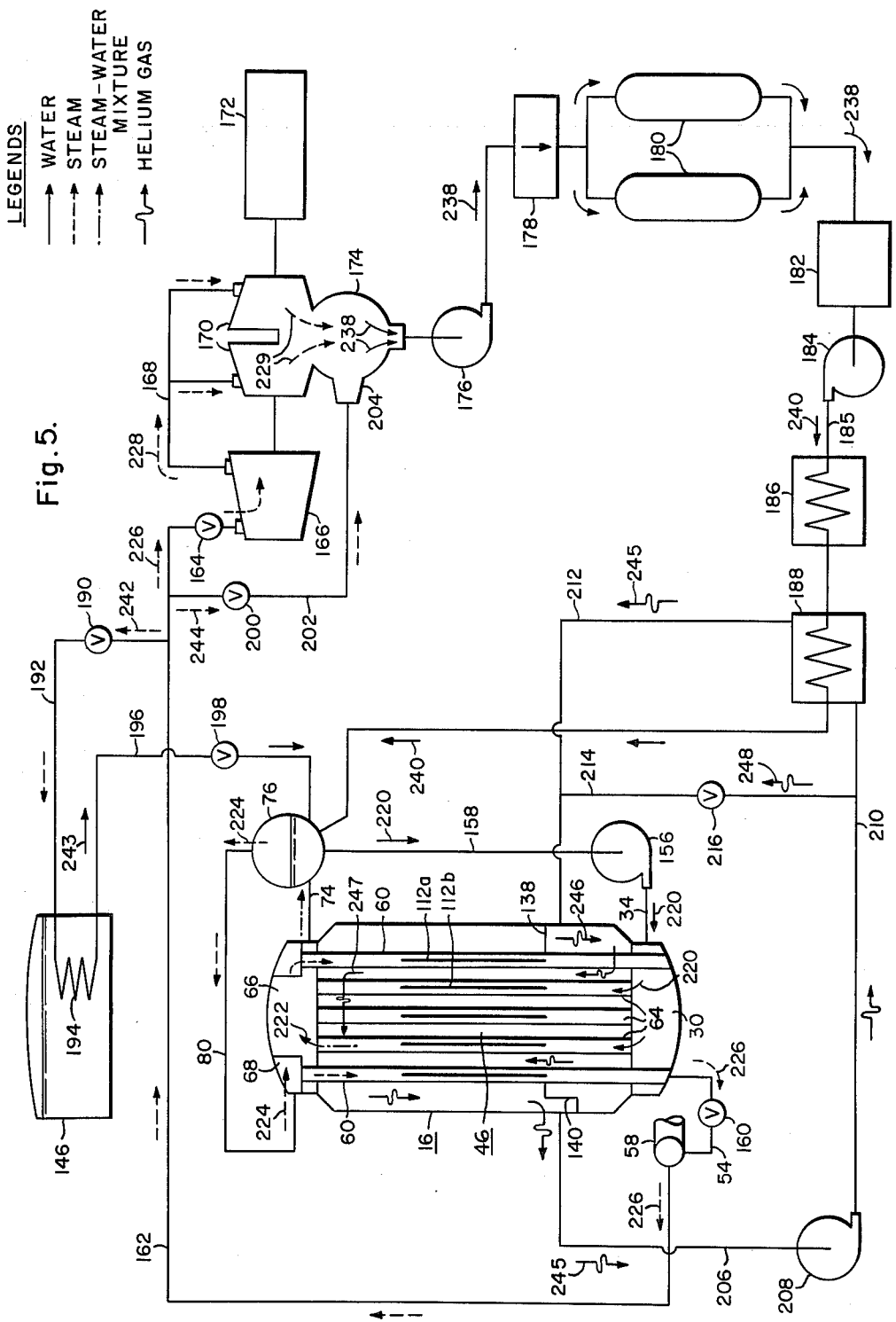
FIG. 5 is a schematic fluid circuit diagram of the vapor generating system with certain auxiliary equipment and external vapor utilizing means.

Referring now to FIG. 5 of the drawings, an operational explanation of IBSHR will be given. To aid in the understanding of this flow circuit a legend has been established, as shown in FIG. 5; wherein, water is indicated by a solid line flow arrow, steam is indicated by a broken line flow arrow, steam-water mixture is indicated by a dot-dash line flow arrow, and helium gas is indicated with a solid line flow arrow with a single wave in the line. Reference can also be made to FIGS. 1, 3 and 4, for a clearer understanding of the flow circuitry within the reactor 16, the upper stayed-tube sheet 20, and between the reactor 16 and the steam drums 76.

A circulating pump 156, located opposite the lower portion of the reactor 16, pumps the primary water, as indicated by a solid line arrow 220, through the circulating pump discharge conduit 34 to the lower plenum chamber 30. The primary water then flows through the reactor boiling tubes 64 and flows over the fissile fuel assemblies 112b, where the primary water is heated by the fuel assemblies 112b. As the primary water flows through the reactor boiling tubes 64, it also absorbs heat from the graphite moderator surrounding the reactor boiling tubes 64. The primary water then changes into a steam-water mixture, as indicated by a dot-dash line flow arrow 222, which flows into the steam-water space 66. From the steam-water space 66 the steam-water mixture flows to the lower portion of the steam drum 76, which is located opposite the upper portion of the reactor 16. In the steam drum 76, the steam-water mixture is separated into steam, as indicated by a broken line flow arrow 224, and into primary water 220. Since the circulation ratio (pounds of water/pounds of steam) is approximately ten to one, ten pounds of primary water 220 is returned to the circulating pump 156 through a circulating pump suction conduit 158 for every pound of substantially dry, saturated steam 224 flowing to the steam space 68 via the reactor steam inlet conduit 80. The saturated steam then flows downward through the reactor superheat tubes 60 and absorbs heat from the fuel assemblies 112a over which the steam passes and from the graphite moderator surrounding the reactor superheat tubes 60 to become superheated steam as indicated by a broken line flow arrow 226. The superheated steam 226 then flows from the reactor superheat tubes 60 through the superheat tubes 54 into a superheat outlet header 58.

The boiling region of the reactor core 46 does not require orificing, because of the flat radial flux distribution in the center portion of the reactor core 46 and the large margin between the operating flux level and the burnout heat flux. However, the superheat region of the reactor core 46 does require orificing because of a somewhat steeper flux gradiant. Therefore, the temperature of the superheated steam 226 leaving the reactor superheat tubes 60 is controlled by an orifice means, such as a flow control valve 160 located in each of the superheat tubes 54. The superheated steam then flows from the superheat outlet header 58, through a superheat conduit 162, through a high pressure turbine trip valve 164, and into a high pressure turbine 166. The superheated steam then flows through the high pressure turbine 166, through a cross-over conduit 168, and into and through a low pressure turbine 170. The steam while passing through the high pressure turbine 166 and the low pressure turbine 170 turns the rotor within the turbine which in turn turns the generator rotor and produces A.C. power in the generator 172. The low pressure turbine outlet steam then flows from the low pressure turbine 170 into a condenser 174. The steam, as indicated by a broken line flow arrow 229, upon entering the shell side of the condenser 174 is condensed by cooling water such as river water flowing through the condenser tubes. The condensate, as indicated by a solid line flow arrow 238, then flows to a condensate pump 176. The condensate pump 176 then pumps the condensate 238 through a filter 178, through at least one demineralizer 180, and then to a deaerator 182. The filter 178 removes corrosion products, the demineralizer 180 removes ionized particles, and the deaerator 182 removes non-condensable gases within the condensate 238. The condensate then flows from the deaerator 182 by gravity to a boiler feed pump 184. The boiler feed pump 184 then pumps the condensate as high pressure boiler feed water, indicated by the solid line flow arrow 240, through a high pressure heater 186, a helium cooler 188, and back to the steam drum 76. Additional low pressure and high pressure heaters can be installed respectively ahead of and after the boiler feed pump 184 to increase the thermal efficiency of the plant. All the heaters receive extraction steam from the turbine to heat the condensate flowing through the low pressure heaters and also to heat the boiler feed water flowing through the high pressure heaters. In addition, the helium cooler 188 is used to cool helium and at the same time to heat the boiler feed water.

An emergency cooling system is also provided to maintain adequate cooling of the active core 46 in the event of loss of power to the circulating pump 156. In the case of such a failure, water flow is maintained in the reactor boiling tubes 64 by natural circulation from the steam drum 76. The reactor superheat tubes 60 in turn are cooled by the steam generated in the reactor boiling tubes 64. An emergency cooling valve 190 is then opened to cool the steam produced by the reactor 16. The steam then flows, as indicated by broken line flow arrow 242, from the superheat conduit 162, through the emergency cooling valve 190, and through an emergency cooling inlet conduit 192 to an emergency cooler 194. The emergency cooler 194 is a submerged coil located in the refueling tank 146, which is located above the reactor 16 and is filled with water. The steam is condensed in the emergency cooler 194. The condensed steam or water flows, as indicated by solid line flow arrow 243 from the emergency cooler 194, through an emergency cooling outlet line 196, through an emergency cooling check valve 198, and returns to the steam drum 76. The emergency cooling check valve 198 permits the flow of water 243 only in a direction from the emergency cooler 194 to the steam drum 76 but will not permit a reverse flow to occur. During normal operation, the emergency cooling valve 190 is closed to prevent steam from bypassing the high pressure turbine 166, and the emergency cooling check valve 198 prevents any water from flowing from the steam drum 76 into the emergency cooler 194. The emergency cooler 194 is located in the refueling tank 146 at an elevation sufficiently above the steam drum 76 to permit gravity water return from the emergency cooler 194 to the steam drum 76.

In the event of a loss of power accident (e.g. a turbine trip-out), a steam dump system is used to maintain proper circulation within the reactor 16 with a minimum loss of steam to the atmosphere through the safety valves which would normally open on a turbine trip-out. Upon a turbine trip-out, the high pressure turbine trip valve 164 closes. A steam dump valve 200, which is electrically interlocked with the high pressure turbine trip valve 164, opens simultaneously with the closing of the turbine trip valve 164. Steam, as indicated by broken line flow arrow 244, then flows from the superheat conduit 162, through the steam dump valve 200, through a steam dump line 202, through a steam dump 204, and then into the condenser 174. The steam is then condensed in the condenser 174 as previously described, and the condensate then follows the fluid path previously described from the condenser 174 to the steam drum 76.

In this example the choice of graphite as a moderator requires a moderator cooling system to: (1) prevent oxidation of the graphite at high temperatures, (2) limit control rod temperatures, (3) maintain peak graphite temperatures below the temperature at which a carbon-water reaction could be significant in the event of a reactor tube rupture and (4) limit the total thermal capacity of the graphite mass. To accomplish this an inert gas (helium) blankets the graphite and is circulated through gas passages around the reactor tubes, control rods, and the graphite matrix as a heat transfer, heat transport medium. The heated helium leaves the reactor 16, enters a gas outlet conduit 206, and flows to a blower 208, as indicated by a single wave solid line flow arrow 245. The blower 208 discharges the helium into a blower outlet conduit 210, which conducts the helium from the blower 208 to the helium cooler 188. The helium 245 enters the shell side of the helium cooler 188 and is cooled by passing over tubes within the helium cooler 188 through which the boiler feed water flows. After the helium has been cooled in the helium cooler 188, the helium 245 flows through a gas inlet conduit 212 to the reactor 16. The helium enters the reactor 16 and is directed downward, as indicated by a single wave solid line flow arrow 246, by the horizontal gas baffle 138. The helium 246 then makes a single upward pass inside the reactor 16 through the annular gaps between the graphite and the reactor tubes and also between the graphite and the control rods 44. The helium exits from the active core 46 near the top of the reactor 16, as indicated by a single wave solid line flow arrow 247, and then flows downwardly within the periphery of the reactor 16. The helium then flows from the reactor 16 into the gas outlet conduit 206 to complete the flow cycle of the helium. The vertical gas baffle 140 prevents the helium from bypassing the active core 46, when it first enters the reactor 16. A bypass helium conduit 214, which couples the blower outlet conduit 210 to the gas inlet conduit 212, permits hot helium gas to bypass the helium cooler 188, as indicated by a single wave solid line flow arrow 248. This permits temperature control of the helium 246, which enters the reactor 16, by a helium temperature control valve 216, which is installed in the bypass helium conduit 214 and controls the amount of helium that bypasses the helium cooler 188.

REHEAT-IBSHR

Figure 6:
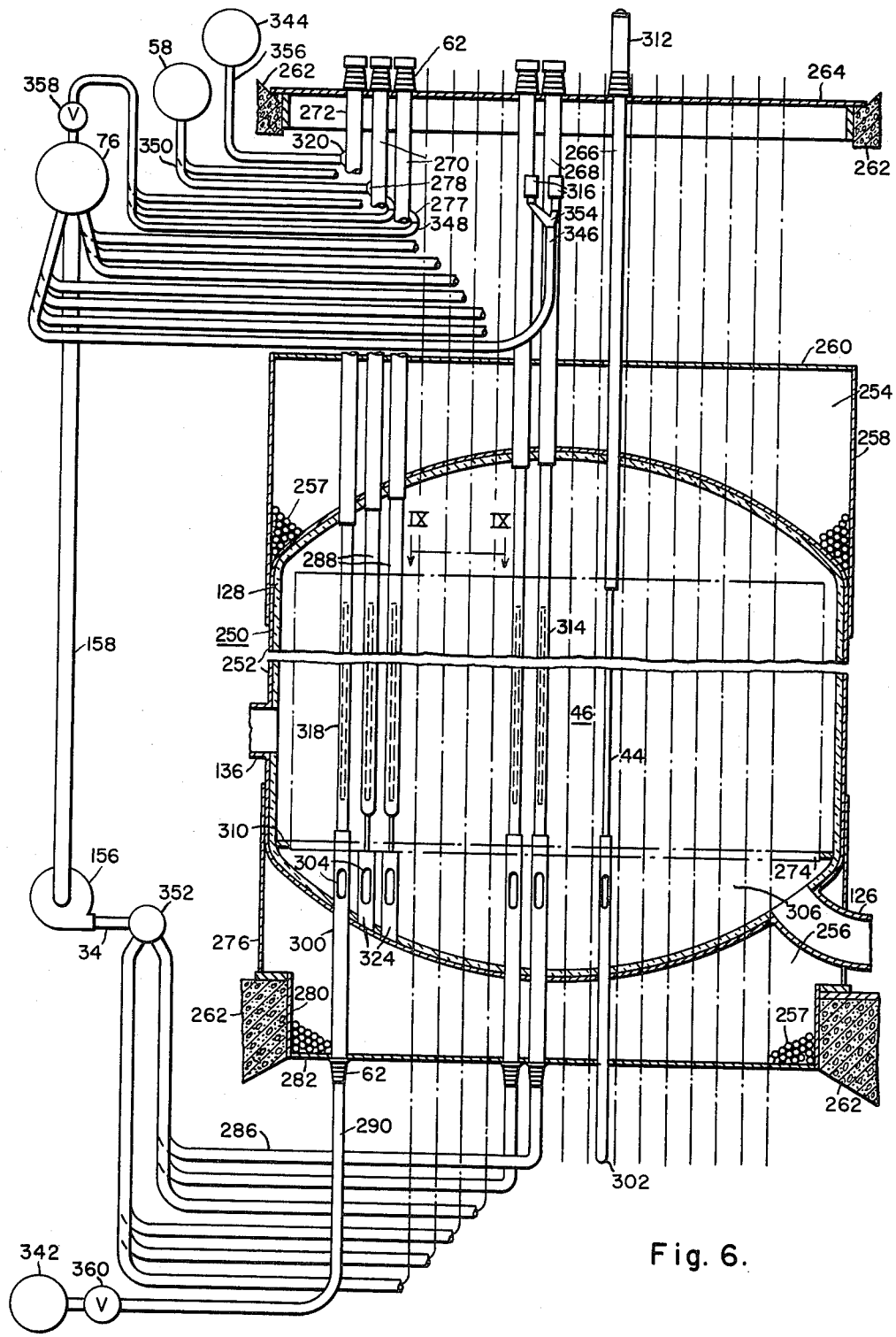
FIG. 6 is a vertical sectional view of a modified form of the reactor shown in FIG. 1.

Referring now to FIGS. 6 through 9 of the drawings and in particular to FIG. 6, another modification of the reactor of the invention is depicted therein. The overall formation of a Reheat-IBSHR 250 of FIG. 6 is generally similar to FIG. 1 and consequently similar reference characters have been employed to identify corresponding parts. A reactor vessel 252 is a vertical cylindrical tank equipped with an external upper biological shield 254 and a lower biological shield 256. The reactor vessel 252 is immersed in and cooled by the neutron shield tank water (not shown) which surrounds it. The upper and lower shields 254 and 256, respectively, comprise a combination of water and steel shot 257. The steel shot 257 in the upper shield is contained by a cylindrically shaped shell 258, which serves as a reactor vessel extension and has its lower end welded to the reactor vessel 252. A circular cover plate 260, which rests on the reactor vessel extension 258, serves as a cover plate to prevent dirt from getting into the upper shield 254. A circularly shaped reactor cover plate 264 rests on a concrete foundation 262. The reactor cover plate 264 forms the bottom of a refueling tank (not shown), which is filled with water. A gasket (not shown) can be used as a seal between the lip of the reactor cover plate 264 and the concrete foundation 262 to prevent water from leaking by the reactor cover plate 264. The cover plate 264 is also located at a point sufficiently high above the Reheat-IBSHR 250 to permit a plurality of tubes to pass between the cover plate 264 and the upper shield cover plate 260.

A plurality of vertically positioned boiling tube extensions 268, superheat tube extensions 270, and reheat tube extensions 272 extend from a point a short distance below the insulation 128, through vertically aligned holes in the top of the reactor vessel 252, the upper shield cover plate 260, and the reactor cover plate 264, and extend to a point a short distance above the reactor cover plate 264. Upper control rod sleeves 266 are installed in the same manner as the tube extensions 268, 270, and 272, except that the control rod sleeve penetrates the reactor 250 to the top of the reflector region.

Referring now in particular to FIG. 7, there is shown a sectional elevation of the aforementioned boiling tube extension 268 welded to the top of the reactor vessel 252 and passing slidably through the upper shield cover plate 260 and the reactor cover plate 264. Also shown in FIG. 7 is a bellows joint 62 having one end welded to the reactor cover plate 264 and the other end welded to the extension 268. The bellows joint 62 provides for the differential expansion which occurs between the aforementioned extension and the external items between the top of the reactor 252 and the reactor cover plate 264. The aforementioned description and explanation also applies to the tube extensions 270 and 272 and to the upper control rod sleeve 266.

Referring again to FIG. 6, insulation 128 is provided to the entire inner surface of the reactor vessel 252 in the same manner as previously described for FIG. 1, in order to reduce heat losses to the neutron shield tank water (not shown).

A lower vessel skirt 276, comprising a cylindrically shaped shell and having an annular ring welded to the lower end of the shell, is welded to the lower portion of the reactor vessel 252 and rests on a concrete foundation 262. A cylindrically shaped shell 280 for the lower shield is vertically positioned and has its upper end welded to the inner surface of the annular ring which forms part of the lower vessel skirt 276. A circularly shaped lower shield plate 282 is then positioned horizontally and welded to the lower end of the lower shield shell 280. The weight of the reactor vessel 252, all components within the reactor vessel 252, the upper shield 254, and the lower shield 256 is transmitted to the concrete foundation 262 through the lower vessel skirt 276. The gas inlet nozzle 126 and the gas outlet nozzle 136 are formed in the reactor vessel 252 in the same manner as previously described for FIG. 1, with the exception that in this example the gas inlet nozzle 126 has been relocated so as to enter the bottom of the reactor vessel 252.

The graphite portion contained within the reactor vessel 252 is generally similar to that described for FIG. 1 and comprises a moderator and reflector region as previously described for FIG. 1. The combined moderator and reflector unit again comprises a plurality of graphite cells 284 (FIG. 9). In this example, however, the graphite cells 284 have a square cross-section instead of a hexagonal cross-section as previously described for FIG. 2. Each graphite cell 284 within the active core 46 is provided with a bored passage 292 to receive a reactor boiling tube 314, a reactor re-entrant superheat tube 288, or a reactor reheat tube 318. As shown in FIG. 9, a control rod passage 294 is formed by a circular hole at the junction of four graphite cells. Also shown in FIG. 9 is a plurality of bored holes 296 in the periphery of the graphite cells 284 to permit additional flow of helium over the exterior of the graphite cells 284. Graphite cells in the reflector region (not shown) do not have any tube passages 292 or gas passage holes 294; however, holes can be provided if cooling of the graphite cells is necessary in the reflector region. FIG. 9 also shows one control rod passage 294 for every four tube passages 292.

The graphite cells 284 are supported by a graphite support structure 274 which in turn comprises a plurality of segmented plates to be described hereinafter. Each segmented plate in turn is supported by an individual tubular support also to be described hereinafter. The tubular sleeve 300 is vertically positioned and penetrates the bottom of the reactor vessel 252 and the lower shield plate 282 and is welded at both penetrations, as shown more clearly in FIG. 7. A lower control rod sleeve 302 is similarly positioned and installed as described for the tubular sleeve 300. The lower control rod sleeve 302 is used only when required to receive the control rods 44 which are inserted into the active core 46 from the bottom of the Reheat-IBSHR 250. In this example 30% of the control rods 44 are inserted upwardly into the active core 46, and 70% of the control rods 44 are inserted downwardly into the active core 46. Each sleeve 300 and each lower control rod sleeve 302 has a plurality of elongated holes 304, which permits the flow of helium from a lower plenum chamber 306 into the inside of the sleeves 300 and 302. The lower plenum chamber 306 comprises the space between the bottom of the reactor vessel 252 and the graphite support structure 274. An annular baffle 310 is fastened to the periphery of the support structure 274 and butts against the inside of the insulation 128 in order to prevent the helium which enters the reactor vessel 252 from bypassing the active core 46.

The control rods 44 are generally similar to those described for FIG. 1. However, in this example, the control rods 44 are driven by hermetically sealed drum and cable type mechanisms 312, which are all located in the refueling pool above the reactor cover plate 264. The control rods 44 inserted upwardly into the active core 46 provide axial flux shaping capability. However, the control rods 44 inserted downwardly into the active core 46 provides the gravity scram requirement. The control rods 44 can be removed through the top of the reactor vessel 250 by cutting the weld between the drum and cable type mechanism 312 and the upper control rod sleeve 266. The drum and cable type mechanism 312 and the control rod 44 can then be removed.

Referring now to FIG. 7, a detailed construction of a reactor boiling tube 314 is shown. The reactor boiling tube 314 is positioned vertically and extends upwardly in a coaxial manner from a point a short distance below the lower shield plate 282 through the tubular sleeve 300, through the graphite cell 284, and extends into the boiling tube extension 268 to a point a short distance above the upper shield plate 260 at which point the reactor boiling tube 314 is welded to the inner surface of the boiling tube extension 268. One end of the bellows joint 62 is then welded to the lower portion of the tubular sleeve 300, and the other end of the bellows joint 62 is welded to the reactor boiling tube 314. The fuel assembly 112b is located within the reactor boiling tube 314 at a location midway between the top and bottom of the Reheat-IBSHR 250. Surrounding the reactor boiling tube 314 is the graphite cell 284. The graphite cell 284 is supported by a squarely shaped collar 298, which is welded to the tubular sleeve 300. The tubular sleeve 300 passes through and extends a short distance beyond the collar 298. The sleeve 300 fits into an inner annular offset formed at the lower end of the graphite cell 284 and acts as a lateral guide for the cell 284. The collars 298 form part of the previously mentioned graphite support structure 274. The collar 298 can also be made so that a plurality of graphite cells 284 are supported by only one collar 298 which has a plurality of tubular sleeves 300 welded thereto.

As indicated in FIG. 7, the annular gap surrounding the reactor boiling tube 314 permits the flow of helium upwardly from the tubular sleeve 300 over the surface of the reactor boiling tube 314, as indicated by flow arrow 249. Also shown is the flow of primary water 220, which enters the bottom of the reactor boiling tube 314 and flows upwardly over the fuel assembly 112b. The water then absorbs heat from the fuel assembly 112b and is transformed into a steam-water mixture 222. The steam-water mixture continues to flow in an upwardly direction, leaves the reactor boiling tube 314, and enters the boiling tube extension 268. The steam-water mixture 222 then leaves the boiling tube extension 268 through a boiling tube extension outlet nozzle 316.

Returning now to FIG. 6, a reactor reheat tube 318 is constructed in the same manner as the reactor boiling tube 314 described in FIG. 7. However, in operation, slightly superheated steam enters the reactor reheat tube 318 through a reheat tube extension inlet nozzle 320. The steam then flows downwardly inside the reactor reheat tube 318 and passes over the fuel assembly contained within the reactor reheat tube 318, where the steam absorbs heat from the fuel assembly. The steam, upon the absorption of heat, becomes further superheated steam and continues to flow downwardly through the reactor reheat tube 318. The refueling or recycling of fuel assemblies 112, contained in the reactor boiling tubes 314 and the reactor reheat tubes 318, is accomplished in the same manner as previously described for the reactor superheat tubes 60 in FIG. 1. The removal of a reactor boiling tube 314 or the reactor reheat tube 318 is also accomplished in the same manner as previously described for the reactor superheat tubes 60 in FIG. 1.

Referring now to FIG. 8, there is shown a typical arrangement for a reactor re-entrant superheat tube 288, which is exemplary of the plurality of reactor re-entrant superheat tubes 288 contained within the superheat region of the reactor 250. A tubular support 324 extends from the torispherical bottom head of the reactor vessel 252 vertically to a squarely shaped plate 322, which is located adjacent to and in the same horizontal plane as the previously described collars 298. The plate 322 also forms part of the previously mentioned graphite support structure 274. The tubular support 324 is welded to the bottom head of the reactor vessel 252 and is also welded to the square plate 322. The tubular support 324 also has a plurality of elongated openings 304 which permit passage of helium from the lower plenum chamber 306 to the inside of the tubular support 324. An annular ring 326, which is vertically above and directly in line with the tubular support 324 is placed on top of the square plate 322 and welded thereto. The graphite cell 284, which has an offset annular space at its lower end formed so as to fit over the annular ring 326, is then vertically positioned on and supported by the square plate 322. The annular ring 326 serves as a guide to hold the graphite cell 284 in a fixed lateral position.

Positioned coaxially within the graphite cell 284 is the reactor re-entrant superheat tube 288, which forms an annular gap between the re-entrant superheat tube 288 and the graphite cell 284 to permit the flow of helium therein. The re-entrant superheat tube 288 comprises an outer re-entrant tube 328 and an inner re-entrant tube 330, the inner re-entrant tube 330 being vertically disposed and coaxially displaced from the outer re-entrant tube 328 so as to form an annular passage between the inner and outer tubes 328 and 330, respectively. The annular passage between the inner tube 330 and the outer tube 328 serves as a flow path for saturated steam from a superheat tube inlet nozzle 277 to the lower portion of the outer re-entrant tube 328, as indicated by flow arrow 224.

The outer-re-entrant tube 328 extends from a point a short distance below the active core 46 to a point a short distance above the upper shield cover plate 260 and within the superheat tube extension 270. The upper end of the outer re-entrant tube 328 is open, but the lower end of the tube 328 is sealed by a hemispherically shaped cap 338 welded thereon. To the bottom of the cap 328 is welded a cylindrically shaped re-entrant tube guide pin 332, which extends downwardly through a hole 334 formed in the center of the square plate 322. The re-entrant tube guide pin 332 extends downwardly only a short distance below the square plate 322 and serves as a guide to maintain the lateral positions of the outer re-entrant tube 328. The square plate 322 also contains a plurality of holes 336 within it which permit the flow of helium from inside the tubular support 324 to the annular gap formed between the outer re-entrant tube 328 and the graphite cell 284.

Returning now to the inner re-entrant tube 330, the inner tube 330 extends upwardly from a point at the bottom of the active core 46, through the outer re-entrant tube 328, and coaxially into the superheat tube extension 270 to a point between the superheat tube inlet nozzle 277 and a superheat tube outlet nozzle 278, where the inner re-entrant tube 330 is welded to the inner surface of the superheat tube extension 270. The portion of the inner tube 330, which extends above the outer re-entrant tube 328, forms an annular passage between the inner re-entrant tube 330 and the superheat tube extension 270 so as to provide the upper portion of the flow path from the superheat tube inlet nozzle 277 to the lower portion of the outer re-entrant tube 328. The inner re-entrant tube 330 has an open end at the top and a lip 340 at the bottom which extends radially inwardly to provide a support for the fuel assembly 112a and to permit the flow of saturated steam from the lower portion of the outer tube 328 into the inner tube 330. A fuel assembly 112a is located vertically in the same relative position as previously described for the fuel assembly 112b in the reactor boiling tube 314. The steam, which enters the inner re-entrant tube 330, flows over the fuel elements of the fuel assembly 112a, absorbs heat, and becomes superheated. The superheat steam then flows in an upwardly direction out of the top of the inner re-entrant tube 330 and into the upper portion of the superheat tube extension 270 from which point the steam exits through the superheat tube outlet nozzle 278.

Returning now to FIG. 6 of the drawings, a neutron shield tank (not shown), containing water for the absorption of neutrons that escape from the reactor 250, surrounds the outer vertical periphery of the upper shield 254 and the reactor 250. Vertically surrounding the neutron shield tank (not shown) is a concrete biological shield (not shown). Outside the biological shield and above the reactor 250 are located the steam drum 76, the superheat outlet header 58 and a reheat outlet header 344. Outside the biological concrete shield (not shown) and below the reactor 250 are located the circulating pump 156, a circulating water header 352, and a reheat inlet header 342. The circulating pump suction conduit 158 couples the bottom of the steam drum 76 to the circulating pump 156. The circulating pump discharge conduit 34 then couples the circulating pump 156 to the circulating water header 352. A boiling inlet tube 286 for each of the reactor boiling tubes 314 individually couples each of the reactor boiling tubes 314 to the circulating water header 352. Two adjacent boiling tube extension outlet nozzles 316 are coupled to a single Y connection 354, which in turn is coupled to the steam drum 76 by a single boiling outlet tube 346. Two boiling tube extension outlet nozzles 316 are coupled to a single boiling outlet tube 346 in order to reduce the number of boiling outlet tubes 346 required to couple the outlet flows from the reactor boiling tubes 314 to the steam drum 76.

Each of the reactor re-entrant superheat tubes 288 is coupled to the steam drum 76 by a superheat inlet tube 348 in order to permit the flow of saturated steam from the steam drum 76 to the superheat tube extension 270. In each of the superheat inlet tubes 348 is installed an orificing means such as a superheat inlet tube valve 358, which is used to control the flow of steam through the reactor re-entrant superheat tubes 288 in order to control the outlet temperature of the superheat steam as it flows from the reactor re-entrant superheat tube 288. Each of the superheat tubes outlet nozzles 278 are then coupled to the superheat outlet header 58 by a superheat outlet tube 350 in order to permit the flow of superheated steam from the reactor re-entrant superheat tube 288 to the superheat outlet header 58.

The lower end of each of the reactor reheat tubes 318 is coupled to the reheat inlet header 342 by the reheat inlet tube 290 in order to permit the flow of reheat steam from the reheat inlet header 342 to the reactor reheat tubes 318. In each of the reheat inlet tubes 290 is installed an orificing means such as a reheat inlet tube valve 360, which is used to control the flow of reheat steam through the reactor reheat tube 318 as a means of controlling the outlet temperature of the reheat steam leaving the reactor reheat tube 318.

Each of the reheat tube extension outlet nozzles 320 are coupled to the reheat outlet header 344 by a reheat outlet tube 356 in order to permit the flow of reheat steam to the reheat outlet header 344 from the reactor reheat tube 318.

The following tabulation of plant and reactor characteristics and of materials of construction are presented as a guide to the construction embodying the present invention of a Reheat-IBSHR with the obvious intent that the tabulation is merely exemplary of an illustrative application of the invention and not limitative thereof. Obviously, differing characteristics and materials can be selected by the nuclear engineer upon the basis of readily available technology, when constructing a nuclear plant having a differing power rating.

Reactor data summary
[340 MWe Reheat IBSHR]

| Description | Units | Boiler | Superheat | Reheater |
|---|---|---|---|---|
| Heat Balance: | | | | |
| Total Reactor Power | MWt | | 820 | |
| Reactor Power | MWt | 397 | 303.5 | 119.5. |
| Gross Turbine Power | MWe | | 355 | |
| Net Plant Power | MWe | | 334 | |
| Net Plant Eff | Percent | | 40.7 | |
| Turbine Cycle Conditions: | | | | |
| Throttle Temperature | °F | | 1,000 | |
| Throttle Pressure | P.s.i.g | | 2,400 | |
| Total Steam Flow | Lb./hr | | 2,482,000 | |
| Condenser Back Press | In Hg abs | | 1½ | |
| Final Feedwater Temp | °F | | 506 | |
| Number Feedwater Heating Stages | # | | 7 | |
| Reheat Temperature | °F | | | 1,000. |
| Reheat Pressure (Turbine Inlet) | P.s.i.a | | | ~675. |
| Reactor Description: | | | | |
| Reactor Vessel: | | | | |
| Inside Diameter | Ft | | 26.6 | |
| Inside Height | Ft | | 32.3 | |
| Wall Thickness | In | | 1.125 | |
| Material | | | 304 SS | |
| Design Pressure | P.s.i.g | | 100 | |
| Design Temperature | °F | | 230 | |
| Active Core: | | | | |
| Active Equivalent Diameter | Ft | | ~20.6 | |
| Active Height | Ft | | 16.3 | |
| Active Core Volume | Ft.$^3$ | 2,310 | 1,600 | 1,510. |
| Total Uranium Loading | Kg. U | 24,385 | 14,820 | 9,722. |
| Initial U-235 Enrichment | w/o | 1.98 | 3.13 | 2.32. |
| Final U-235 Enrichment | w/o | .67 | 1.62 | 1.02. |
| Moderator to Fuel Volume Ratio | | 36.0 | 41.0 | 66.6. |
| Moderator | | | Graphite | |
| Coolant | | Water and steam | Steam | Steam. |
| Reflector: | | | | |
| Material | | | Graphite | |
| Axial Thickness | Ft | | ~2 | |
| Radial Thickness | Ft | | ~2 | |
| Pressure Tubes: | | | | |
| Total Numbers | | | 244 | |
| Number | | 104 | 72 | 68. |
| Material | | Zirconium alloy | Zirconium alloy | Niobium alloy. |
| Type | | Through | Re-entrant | Through. |
| Inside Diameter | In | 5.10 | 5.10 | 4.00. |
| Wall Thickness | In | .490 | .490 | .080. |
| Design Pressure | P.s.i.g | 3,000 | 3,000 | 900. |
| Design Temperature | °F | 700 | 700 | 1,200. |
| Fuel Elements: | | | | |
| Fuel Material | | | $UO_2$ | |
| Fuel Element Geometry | | | Annular | |
| Clad Material | | Zircaloy-4 | 304 SS | 304 SS. |
| Clad Thickness | In | .025 | .012 | .012. |
| Fuel "Meat" Thickness | In | .160 | .236 | .196. |
| Fuel Clad Gap | In | 0 | 0 | 0. |
| Fuel Assemblies: | | | | |
| Total Number | | 208 | 144 | 136. |
| Number of Elements (annular rings) per Assy | | 7 | 5 | 4. |
| Diameter of Assembly | In | 4.86 | 3.76 | 3.81. |
| Lattice Spacing in Core | In | 14 | 14 | 14. |
| End Fitting Materials | | Zr | 304 SS | 304 SS. |
| Reactor Control: | | | | |
| Absorber Material | | | BC | |
| Number of Control Rods | | | 69 | |
| Cross Sectional Dimensions | In | | 4" OD x 2" ID | |
| Effective Length | Ft | | 16 | |
| Type of Drive | | | Drum and cable | |
| Performance Data: | | | | |
| Reactor Coolant Outlet Temperature | °F | 681 | 1,000 | 1,000. |
| Reactor Coolant Inlet Temperature | °F | 676 | 681 | 698. |
| Primary System Operating Pressure | P.s.i.a | 2,815 | 2,725 | 750. |
| Primary Coolant Flow | Lb./hr | 29,780,000 | 2,482,000 | 2,266,490. |
| Avg. Coolant Velocity-Core Inlet | Ft./sec | 34.0 | 39.0 | 163.5. |
| Max. Fuel Center Temp | °F | 1,640 | 3,520 | 2,250. |
| Max. Clad Temperature | °F | 686 | 1,240 | 1,250. |
| Max. Core Heat Flux | B.t.u./hr./ft.$^2$ | 234,000 | 402,000 | 201,000. |
| Avg. Core Heat Flux | B.t.u./hr./ft.$^2$ | 85,600 | 159,000 | 79,000. |
| Avg. Core Power Density | Kw./ft.$^3$ | 172 | 190 | 79.1 |
| Peak to Avg. Power Ratio | | 2.63 | 2.53 | 2.53. |
| Avg. Specific Power | 9Kwt./kg. U | 16.3 | 20.5 | 12.3 |
| Fuel Management | | Multi-Region | Multi-Cycle | |
| Avg. Fuel Burnup | MWD/MT | 17,000 | 16,000 | 16,100. |

Primary system components

| Description: | Number |
|---|---|
| Circulating pumps | 4 |
| Steam drums | 2 |
| Superheat outlet headers | 2 |
| Reheat inlet headers | 2 |
| Reheat outlet headers | 2 |

OPERATION OF THE REHEAT-IBSHR

Figure 10:
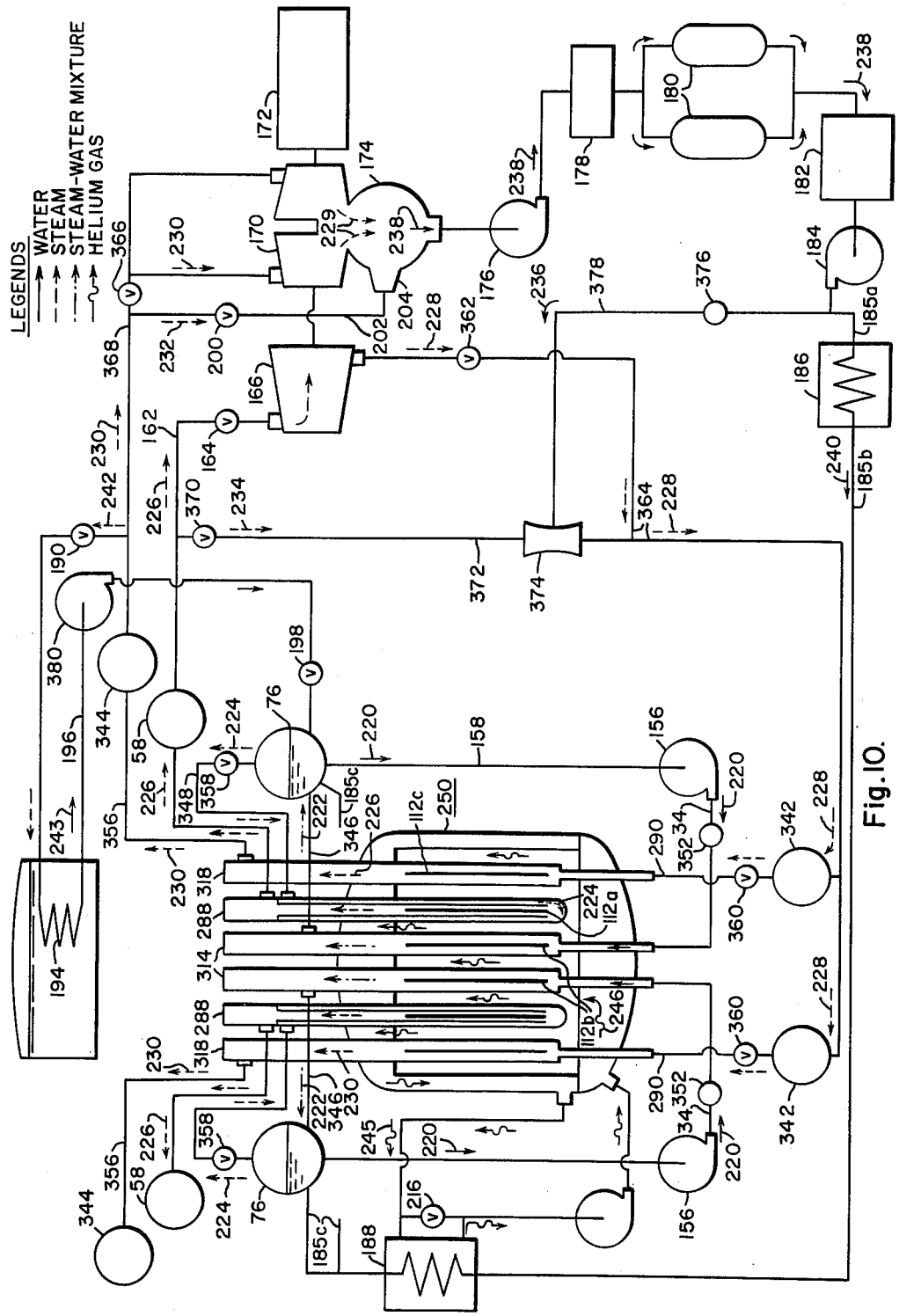
FIG. 10 is a schematic fluid diagram of a vapor generating system with certain auxiliary equipment and external vapor utilizing means including the boiling, superheating, and reheating cycles of the system.

Referring now to FIG. 10 of the drawings an operational explanation of the Reheat-IBSHR 250 will be given. To aid in the understanding of this flow circuit the legend as previously described for FIG. 5 is used again in this instance. Reference can also be made to FIGS. 7 and 8 for a clear understanding of the flow circuitry within the reactor boiling tube 314 and the reactor re-entrant superheat tube 288.

The circulating pumps 156 pump the primary water, as indicated by solid line flow arrow 220, through the circulating pump discharge conduits 34 to the circulating water headers 352. The primary water then flows from the circulating water headers 352 through the boiling inlet tubes 286 to the reactor boiling tubes 314. As the water flows through the reactor boiling tubes 314, it is converted into a steam-water mixture, as indicated by a dot-dash flow arrow 222, by means previously described for FIG. 5. The steam-water mixture then flows from the reactor boiling tubes 314 through the boiling outlet tubes 346 to the lower portions of the steam drums 76. In the steam drums 76 the steam-water mixture 346 is separated into steam, as indicated by a broken line arrow flow 224, and into primary water 220. From the steam drums 76, the primary water flows by gravity to the circulating pumps 156, and the substantially dry saturated steam 224 flows through the superheat tube inlet valve 358, through the superheat inlet tubes 348, and into the reactor re-entrant superheat tubes 288. As previously described for FIG. 8, the steam flow 224 within the re-entrant superheat tube 288 is downwardly in an outer annular passage to the lower portion of the reactor re-entrant tube 288 at which point the steam reverses its flow direction and passes upwardly through the center of the reactor re-entrant superheat tube 288. As the steam flows upwardly through the center of the reactor re-entrant superheat tubes 288, the saturated steam 224 passes over the fuel assemblies 112a contained within the re-entrant tubes 288 and absorbs heat in the same manner as previously described in FIG. 5 to become superheated steam as indicated by the broken line flow arrow 226. Flow control of the steam flowing through the reactor re-entrant superheat tubes 288 with the resulting temperature control of the superheated steam 226 is accomplished by the superheat inlet tube valves 358 in the same manner as previously described for FIG. 5. The superheated steam then flows from the reactor re-entrant superheat tubes 288 to and through the high pressure turbine 166 in the same manner as previously described for FIG. 5. The outlet steam from the high pressure turbine 166 then flows through a turbine outlet valve 362, through a reheat inlet conduit 364 and into the reheat inlet headers 342, as indicated by a broken line flow arrow 228. The superheated steam then passes from the reheat inlet headers 342, through reheat inlet tube valves 360, through the reheat inlet tubes 290, and into the reactor reheat tubes 318. The superheated steam then flows upwardly over the fuel assemblies 112c, contained within the reactor reheat tubes 318, and absorbs heat as described hereinbefore resulting in a rise in the steam temperature to produce reheat steam. The reheat steam then flows from the reactor reheat tubes 318 through the reheat outlet tubes 356, and into the reheat outlet headers 344, as indicated by the broken line flow arrow 230. The reheat steam 230 then flows from the reheat outlet headers 344, through a reheat outlet conduit 368, through a low pressure turbine trip valve 366, and into the low pressure turbine 170. As previously described for FIG. 5, the steam which passes through the high pressure turbine 166 and the low pressure turbine 170 gives up its heat energy by turning the turbine rotor, which in turn causes the generator rotor to rotate and thus produce electrical energy within the generator 172. The steam, after passing through the low pressure turbine 170 is condensed in the condenser 174. The condensate then follows a flow circuitry back to the steam drums 76 as previously described for FIG. 5.

The flow circuitry for the helium gas is generally similar to the flow circuitry described for FIG. 5.

In case of a turbine trip-out, the high pressure turbine trip valve 164, the turbine outlet valve 362, and the low pressure turbine trip valve 366 all close automatically. Simultaneously, the steam dump valve 200, which is electrically interlocked with the turbine valves 164, 362, and 366, opens and permits the reheat steam 230 from the reheat outlet conduit 368 to flow through the steam dump valve 200, through the steam dump conduit 202, and into the steam dump 204, as indicated by the broken line flow arrow 232. This is similar to the steam dump system previously described for FIG. 5; however, the Reheat-IBSHR 250 faces a difficult emergency cooling problem because of the necessity of supplying steam 288, as steam coolant at the proper temperature, to the reactor heat tubes 318 in the reheat region of the active core 46.

To accomplish this, a turbine bypass arrangement comprising a turbine bypass valve 370, a turbine bypass conduit 372, and a desuperheater 374 is provided which couples the superheat conduit 162 to the reheat inlet conduit 364 at a point down stream of the turbine outlet valve 362. On a turbine trip-out, the turbine bypass valve 370, which is electrically interlocked in a similar manner as the high pressure turbine trip valve 164, opens fully and permits superheated steam 226 to flow from the superheat conduit 162, through the turbine bypass valve 370, through the turbine bypass conduit 372, through the desuperheater 374, and into the reheat inlet conduit 364, as indicated by the broken line flow arrow 234. In addition, this turbine bypass arrangement requires a highly reliable source of injection water for the desuperheater 374. This water can best be supplied by the boiler feed-pumps 184, which must be reliable for other emergency injection requirements as well. In this example, two motor driven boiler feed water pumps, with separate electrical power supplies, and one steam turbine driven boiler feed pump, are provided to guarantee this service. The water supply for the desuperheater 374 is provided by an arrangement which comprises a desuperheater flow control valve 376 and a desuperheater inlet conduit 378, which couples a boiler feed conduit 185 at a point between the boiler feed pump 184 and the high pressure heater 186 to the desuperheater 374. Upon a turbine trip-out the desuperheater flow control valve 376, which is electrically interlocked in the same manner as the turbine bypass valve 370, opens and controls the amount of water that flows from the boiler feed pump 184, through the desuperheater flow control valve 376, through the desuperheater inlet conduit 378, and into the desuperheater 374, as indicated by the solid line flow arrow 236. The desuperheater water 236, which flows into the desuperheater 374, is controlled by the desuperheater flow control valve 376 in order to reduce the temperature of the desuperheater steam 234, which enters the desuperheater 374 so as to provide steam 228 of the proper temperature to the reactor reheat tubes 318.

The reheat dump steam 232 flows through the steam dump 204 to the condenser 174 until the reactor power is reduced to the 5% level in this example. At this point, the emergency cooling system previously described for FIG. 5 is capable of absorbing the entire amount of heat produced by the Reheat-IBSHR 250. The emergency cooling system for the Reheat-IBSHR 250 cannot provide a gravity flow to the steam drum 76. Therefore, a drain pump 380 is provided in the emergency cooling outlet line 196 to provide the differential pressure required to pump the condensate from the emergency cooler 194 to the steam drum 76. The drain pump 380 is necessary, because the pressure in the reheat outlet conduit 368 is much lower than the pressure in the steam drum 76 and a sufficient head of water cannot be provided so as to utilize only a gravity feed from the emergency cooler 194 to the steam drum 76.

In this example of the Reheat-IBSHR 250, the active core in plan view comprises three regions; a boiling region, a superheat region and a reheat region. The boiling and superheat regions are the same as previously described for FIG. 2. The reheat region, in this example, is generally annular in configuration and surrounds the superheat region. As has been described hereinbefore, primary water first passes through the boiling region where the water absorbs heat and is converted into a steam-water mixture. Saturated steam is then separated from the steam-water mixture in the steam drum 76. The saturated steam then flows through the superheat region, where it absorbs heat and is converted into superheated steam. The superheated steam is then passed through the high pressure turbine, where the superheated steam gives up a portion of its heat energy in the production of electrical energy. The superheated steam is then passed through the reheat region, where it absorbs heat and the temperature of the superheated steam is raised. The reheat steam is then passed through the low pressure turbine, where the heat energy of the reheat steam is utilized in the production of electrical energy.

While there have been shown and described what are, at present, considered to be the preferred embodiments of the invention, modifications thereto will readily occur to those skilled in the art. For example, it is also to be noted with reference to FIG. 6 that the Reheat-IBSHR 250 can be so constructed to produce only superheated steam by the elimination of the reactor reheat tubes 318 so as to eliminate the reheat region of the Reheat-IBSHR 250. It is also possible to change the reactor re-entrant superheat tubes 288 to the straight-through tube type similar to the construction of the reactor boiling tubes 314.

Also, in another modification of this invention the upper stayed-tube sheet 20 can be made large enough to contain the vapor separating means as an integral part of the tube sheet 20. Therefore, the external vapor separating means and external conduits connecting the vapor separating means to the upper stayed-tube sheet 20 can be eliminated. It is not desired, therefore, that the invention be limited to the specific arrangements shown and described and it is intended to cover in the appended claims all such modifications as fall within the true spirit and scope of the invention.

Accordingly, what is claimed as new is:

1. In a direct cycle neutronic reactor system, the combination comprising an upstanding generally tubular vessel, a nuclear core structure supported within said vessel, means for heating a liquid within a first portion of said core to produce a vapor-liquid mixture, means coupled to said first core portion for separating vapor from said vapor-liquid mixture, means coupled to said separating means for superheating said separated vapor within a second portion of said core, a first external vapor utilizing means for using said superheated vapor, a superheat conduit means coupling said superheating means with said first external vapor utilizing means, means coupling said uitlized superheated vapor to a third portion of said core for reheating said vapor, a first conduit means disposed in bypassing relationship with said first external vapor utilizing means for coupling the outlet of said second core portion to the inlet of said third core portion, means coupled to said first conduit means for removing heat from vapor flowing therethrough, a second external vapor utilizing means coupled to said third core portion, a condensing means coupled to said second external vapor utilizing means, a second conduit means disposed in a bypassing relationship with said second vapor utilizing means coupling said third core portion to said condensing means, and means coupled to said last-mentioned conduit means for reducing the pressure of the vapor flowing therethrough.

2. In a direct cycle neutronic reactor system, the combination comprising an upstanding generally tubular vessel, a nuclear core structure supported within said vessel, means for heating a liquid within a first portion of said core to produce a vapor-liquid mixture, means coupled to said first core portion for separating vapor from said vapor-liquid mixture, means coupled to said separating means for superheating said separated vapor within a second portion of said core, an external vapor utilizing means for using said superheated vapor, a superheat conduit means coupling said superheating means with said external vapor utilizing means, a condensing means located above and coupled to said vapor separating means for providing a gravity flow of condensate to said vapor separating means, and conduit means disposed in a bypassing relationship with said external utilizing means for coupling the outlet of said second core portion to said condensing means.

3. In a direct cycle neutronic reactor system; the combination comprising a vessel; reactor core means mounted in said vessel; a plurality of pressure tubes extending through said core means; each of said pressure tubes having an inlet and an outlet; said pressure tubes being grouped within said core means to form a first group in which boiling occurs, a second group in which superheating occurs, and a third group in which reheating occurs, vapor separating means; first vapor utilizing means; liquid coolant means flowing through said reactor system and adapted to be heated to form vapor by said reactor core; first conduit means coupling the outlets of said first group through said separating means to the inlets of said second group to permit vapor in said separating means to flow to said second group; second conduit means coupling said separating means to the inlets of said first group to permit the flow of liquid coolant in said separating means to said first group; third conduit means coupling the outlets of said second group to said first vapor utilizing means and from said first vapor utilizing means to the inlets of said third group; second vapor utilizing means; fourth conduit means coupling the outlets of said third group through said second vapor utilizing means to said separating means; heat exchange means bypassing said second vapor utilizing means and coupling said fourth conduit means to said vessel for cooling a fluid flowing therebetween; fifth conduit means disposed in bypassing relationship with said first vapor utilizing means for coupling the outlets of said second group to the inlets of said third group; means coupled to said last-mentioned conduit means for removing heat from coolant flowing therethrough; vapor dumping means; sixth conduit means coupled in bypassing relationship with said second vapor utilizing means and coupling said vapor dumping means to said fourth conduit means.

4. In a direct cycle neutronic reactor system; the combination comprising a vessel; reactor core means mounted in said vessel; a plurality of flow passages each having an inlet and an outlet and disposed in said core means; said flow passages being grouped to form a boiling portion, a superheat portion and a reheat portion within said core means; vapor separating means; first vapor utilizing means; liquid coolant means flowing through said reactor system and adapted to be heated to form vapor by said reactor core means; first conduit means coupling the outlets of said boiling flow passages through said separating means to the inlets of said superheating flow passages to permit vapor in said separating means to flow to said superheat portion; second conduit means coupling said separating means to the inlets of said boiling flow passages to permit the flow of liquid coolant in said separating means to said boiling portion; third conduit means coupling the outlets of said superheating flow passages to said first vapor utilizing means and from said first vapor utilizing means to the inlets of said reheating flow passages; second vapor utilizing means; fourth conduit means coupling the outlets of said reheating flow passages through said second vapor utilizing means to said separating means; fifth conduit means disposed in bypassing relationship with said first vapor utilizing means for coupling the outlets of said superheating flow passages to the inlets of said reheating flow passages; means coupled to said last-mentioned conduit means for removing heat from coolant flowing therethrough; vapor dumping means; sixth conduit means coupled in bypassing relationship with said second vapor utilizing means and coupling said vapor dumping means to said fourth conduit means.

5. In a direct cycle neutronic reactor system the combination comprising a vessel; reactor core means mounted in said vessel; a plurality of flow passages each having an inlet and an outlet and disposed in said core means; said flow passages being grouped to form a boiling portion, a superheat portion and a reheat portion within said core means; vapor separating means; first vapor utilizing means; liquid coolant means flowing through said reactor system and adapted to be heated to form vapor by said reactor core means; first conduit means coupling the outlet of said boiling portion through said separating means to the inlet of said superheat portion to permit vapor in said separating means to flow to said superheat portion; second conduit means coupling said separating means to the inlet of said boiling portion to permit the flow of liquid coolant in said separating means to said boiling portion; third conduit means coupling the outlet of said superheating portion to said first vapor utilizing means and from said first vapor utilizing means to the inlet of said reheat core portion; second vapor utilizing means; fourth conduit means coupling the outlet of said reheat portion through said second vapor utilizing means to said separating means; vapor dumping means; fifth conduit means coupled in bypassing relationship with said second vapor utilizing means and coupling said vapor dumping means to said fourth conduit means.

6. In a direct cycle neutronic reactor system; the combination comprising a vessel, reactor core means mounted in said vessel, a plurality of pressure tubes extending through said core means, each of said pressure tubes having an inlet and an outlet, said pressure tubes being grouped to form a boiling portion and a reheat portion disposed within said core means, superheating means coupled to said reactor system and having an inlet and an outlet, vapor separating means, first vapor utilizing means, liquid coolant means flowing through said reactor system and adapted to be heated to form vapor by said reactor core, first conduit means coupling the outlet of said boiling portion through said separating means to the inlet of said superheat means to permit vapor in said separating means to flow to said superheat means, second conduit means coupling said separating means to the inlet of said boiling portion to permit the flow of liquid coolant in said separating means to said boiling portion, third conduit means coupling the outlet of said superheating means to said first vapor utilizing means and from said first vapor utilizing means to the inlet of said reheat core portion, second vapor utilizing means, fourth conduit means coupling the outlet of said reheat portion through said second vapor utilizing means to said separating means, heat exchange means bypassing said second vapor utilizing means and coupling said fourth conduit means to said vessel for cooling a fluid flowing therebetween, fifth conduit means disposed in bypassing relationship with said first vapor utilizing means for coupling the outlet of said superheat means to the inlet of said reheat portion, means coupled to said last-mentioned conduit means for removing heat from coolant flowing therethrough, vapor dumping means, sixth conduit means coupled in bypassing relationship with said second vapor utilizing means and coupling said vapor dumping means to said fourth conduit means.

7. In a direct cycle neutronic reactor system; the combination comprising a vessel; reactor core mounted in said vessel; a plurality of pressure tubes extending through said core; each of said pressure tubes having an inlet and an outlet; said pressure tubes being grouped within said core to form a first group in which boiling occurs, a second group in which superheating occurs, and a third group in which reheating occurs; one of said groups being disposed in the central region of said core, another of said groups being arranged parallely and outwardly of said one group, and the remainder of said groups being arranged parallely and outwardly of said other group; vapor separating means; first vapor utilizing means; liquid coolant means flowing through said reactor system and adapted to be heated to form vapor by said reactor core; first conduit means coupling the outlets of said first group through said separating means to the inlets of said second group to permit vapor in said separating means to flow to said second group; second conduit means coupling said separating means to the inlets of said first group to permit the flow of liquid coolant in said separating means to said first group; third conduit means coupling the outlets of said second group to said first vapor utilizing means and from said first vapor utilizing means to the inlets of said third group; second vapor utilizing means; fourth conduit means coupling the outlets of said third group through said second vapor utilizing means to said separating means.

References Cited by the Examiner

UNITED STATES PATENTS

| | | | |
|---|---|---|---|
| 2,787,593 | 4/1957 | Metcalf | 176—54 |
| 2,806,820 | 9/1957 | Wigner | 176—54 |
| 2,832,733 | 4/1958 | Szilard | 176—52 |
| 2,857,324 | 10/1958 | DeBoisblanc et al. | 176—61 |
| 2,917,444 | 12/1959 | Dreffin | 176—51 |
| 2,957,815 | 10/1960 | Pacault et al. | 60—108 |
| 2,975,118 | 3/1961 | Tognoni. | |
| 2,999,059 | 9/1961 | Treshow | 176—54 |
| 3,047,479 | 7/1962 | Young et al. | 176—60 |
| 3,108,938 | 10/1963 | Nettel et al. | 176—60 |

FOREIGN PATENTS

| | | |
|---|---|---|
| 214,136 | 3/1958 | Australia. |
| 563,693 | 1/1958 | Belguim. |
| 1,141,064 | 3/1957 | France. |
| 1,184,886 | 2/1959 | France. |
| 799,725 | 8/1958 | Great Britain. |
| 844,408 | 8/1960 | Great Britain. |
| 851,820 | 10/1960 | Great Britain. |

REUBEN EPSTEIN, *Primary Examiner.*

CARL D. QUARFORTH, *Examiner.*